US011828665B2

(12) United States Patent
Sekiguchi et al.

(10) Patent No.: US 11,828,665 B2
(45) Date of Patent: Nov. 28, 2023

(54) MOTOR CONTROL DEVICE AND BELT TENSION STATE DETECTION DEVICE

(71) Applicant: Mitsubishi Electric Corporation, Tokyo (JP)

(72) Inventors: Hiroyuki Sekiguchi, Tokyo (JP); Naoto Takano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 426 days.

(21) Appl. No.: 17/285,099

(22) PCT Filed: Oct. 9, 2019

(86) PCT No.: PCT/JP2019/039832
§ 371 (c)(1),
(2) Date: Apr. 14, 2021

(87) PCT Pub. No.: WO2020/090394
PCT Pub. Date: May 7, 2020

(65) Prior Publication Data
US 2021/0348974 A1 Nov. 11, 2021

(30) Foreign Application Priority Data
Oct. 31, 2018 (JP) .................................. 2018-205596

(51) Int. Cl.
*G01L 5/10* (2020.01)
*F16H 7/02* (2006.01)
*H02P 29/00* (2016.01)

(52) U.S. Cl.
CPC ................. *G01L 5/10* (2013.01); *F16H 7/02* (2013.01); *H02P 29/00* (2013.01)

(58) Field of Classification Search
CPC ...... H02P 5/00; H02P 5/50; H02P 5/51; H02P 5/56; H02P 5/69; H02P 5/695747;
(Continued)

(56) References Cited

U.S. PATENT DOCUMENTS 5,698,796 A 12/1997 Hirano

FOREIGN PATENT DOCUMENTS

JP 61-278726 A 12/1986
JP 8-327477 A 12/1996
(Continued)

OTHER PUBLICATIONS

International Search Report and Written Opinion dated Dec. 24, 2019, received for PCT Application PCT/JP2019/039832, Filed on Oct. 9, 2019, 10 pages including English Translation.
(Continued)

*Primary Examiner* — Antony M Paul
(74) *Attorney, Agent, or Firm* — XSENSUS LLP

(57) ABSTRACT

A motor control device is capable of detecting, through use of a small-sized or simple device, a state of belt tension in a belt transmitting torque of an electric motor in a motor system. A motor control device includes a drive controller that outputs a drive command signal that drives an electric motor of a motor system, and a belt tension state value calculation unit that outputs a belt tension state value on a basis of a drive detection signal detecting an angle of rotation, an angular velocity, or an angular acceleration in the motor system. The belt tension state value indicates a state of belt tension in a belt. The motor system includes a load machine, a driven pulley mechanically connected to the load machine, the belt wound onto the driven pulley, a drive pulley that the belt is wound onto, and the electric motor mechanically connected to the drive pulley.

12 Claims, 7 Drawing Sheets

(58) Field of Classification Search
CPC ...... H02P 1/00; H02P 1/26; H02P 1/46; H02P
6/00; H02P 6/005; H02P 6/06; H02P
6/08; H02P 6/12; H02P 6/28; H02P 6/32;
H02P 21/20; H02P 21/22; H02P 23/07;
H02P 27/04; H02P 27/06; H02P 27/08;
H02P 21/13; H02P 29/00; F16H 7/02;
F16H 7/00; G01L 5/10; G01M 13/023
See application file for complete search history.

(56) References Cited

FOREIGN PATENT DOCUMENTS

| JP | 2000-131163 A | 5/2000 | | |
|---|---|---|---|---|
| JP | 2002213550 A | * 7/2002 | ............... | F16H 9/18 |
| JP | 2002-310822 A | 10/2002 | | |
| JP | 2006-169661 A | 6/2006 | | |
| JP | 2013-71536 A | 4/2013 | | |
| JP | 2013-217692 A | 10/2013 | | |

OTHER PUBLICATIONS

Notification of Reason for Refusal dated Oct. 16, 2020, received for TW Application 108137842, 16 pages including English Translation.

* cited by examiner

MOTOR CONTROL DEVICE AND BELT TENSION STATE DETECTION DEVICE

CROSS-REFERENCE TO RELATED APPLICATIONS

The present application is based on PCT filing PCT/JP2019/039832, filed Oct. 9, 2019, which claims priority to JP 2018-205596, filed Oct. 31, 2018, the entire contents of each are incorporated herein by reference.

FIELD

The present invention relates to a motor control device and a belt tension state detection device that each detect belt tension of a belt drive unit composed of pulleys and a belt wound around the pulleys.

BACKGROUND

In a drive mechanism including a belt, decreased belt tensioning force (hereinafter referred to as "belt tension") can lead to slippage and tooth jump (a phenomenon where a tooth of the belt and a tooth of a pulley are displaced relative to each other), among others. There is a need for a device to detect a state of belt tension for the purpose of minimizing or preventing the slippage and the tooth jump and maintaining accuracy in operation of the drive mechanism and power transmission efficiency of the drive mechanism.

A power booster described in Patent Literature 1 has a strain sensor attached to a support for a bearing upon which belt tension acts as a radial load, and the belt tension is estimated on the basis of measured elastic deformation of the support. A belt tension measuring apparatus described in Patent Literature 2 detects an amplitude level of vibration of a belt with a pressure sensing device, calculates a natural frequency from the detected amplitude level, and determines a belt tension from the calculated natural frequency.

A tension measuring device described in Patent Literature 3 detects vibration of a belt by receiving, with a transducer, sound waves produced by the belt vibration. On the basis of a waveform signal of the belt vibration, a natural frequency is determined, and a belt tension is calculated from the determined natural frequency.

CITATION LIST

Patent Literatures

Patent Literature 1: Japanese Patent Application Laid-open No. 2013-71536
Patent Literature 2: Japanese Patent Application Laid-open No. H08-327477
Patent Literature 3: Japanese Patent Application Laid-open No. 2000-131163

SUMMARY

Technical Problem

Each of the conventional techniques requires a detector, such as the strain sensor, the pressure sensing device, or the transducer, for detecting belt tension in a belt of a device. Moreover, a device for detecting the belt tension is larger in scale and more complex because of, for example, an installation space, and wiring for the detector such as the transducer.

The present invention has been made in view of the above-described circumstances, and an object of the present invention is to provide a motor control device that is capable of detecting, through use of a small-sized or simple device, a state of belt tension in a belt transmitting torque of an electric motor in a motor system.

Solution to Problem

A motor control device according to the present invention comprises: a drive controller to output a drive command signal that drives an electric motor of a motor system, the motor system including a load machine, a driven pulley mechanically connected to the load machine, a belt wound on the driven pulley, a drive pulley having the belt wound thereon, and the electric motor mechanically connected to the drive pulley; and a belt tension state value calculation unit to output a belt tension state value on a basis of a drive detection signal detecting one of an angle of rotation, an angular velocity, and an angular acceleration in the motor system, the belt tension state value indicating a state of belt tension in the belt.

Advantageous Effects of Invention

The motor control device that is provided according to the present invention is capable of detecting, through use of a small-sized or simple device, the state of belt tension in the belt transmitting torque of the electric motor in the motor system.

DESCRIPTION OF EMBODIMENTS

With reference to the drawings, a detailed description will be made hereinafter as to embodiments of the present invention. The embodiments described below are illustrative and are not restrictive of the present invention.

First Embodiment

Figure 1:
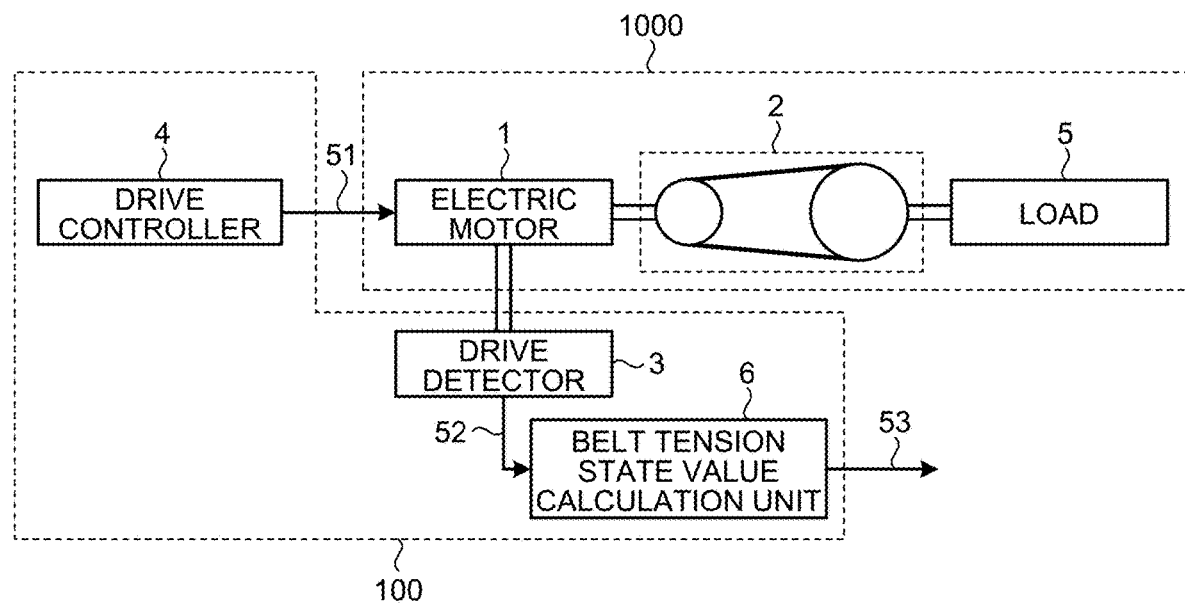
FIG. 1 is a block diagram illustrating a configuration of a motor control device according to a first embodiment of the present invention.
Figure 2:
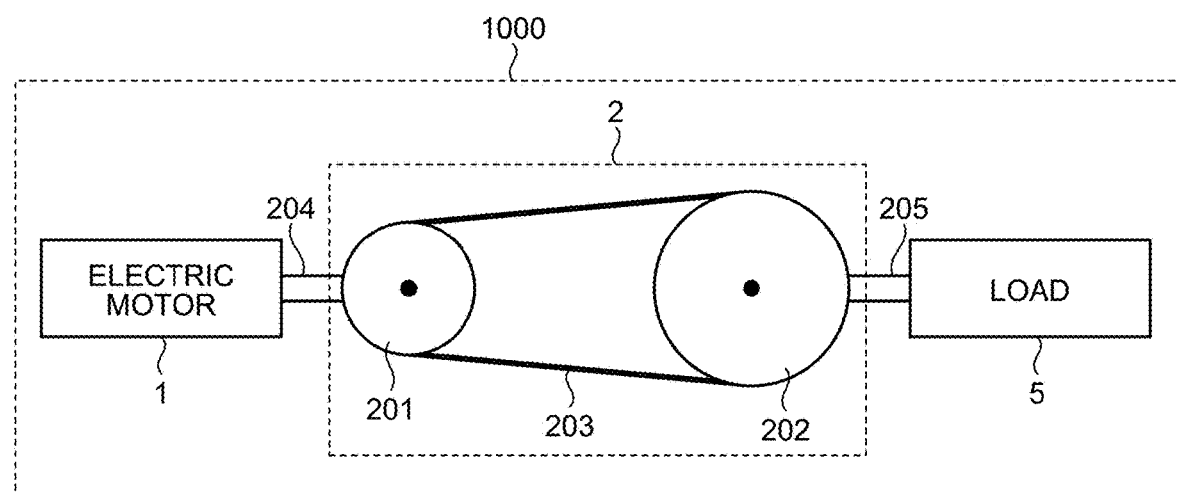
FIG. 2 illustrates a configuration of a motor system according to the first embodiment of the present invention.

FIG. 1 is a block diagram illustrating a configuration of a motor control device 100 according to the first embodiment of the present invention. A motor system 1000 in FIG. 1 includes an electric motor 1, a belt drive unit 2 mechanically connected to the electric motor 1, and a load machine 5 mechanically connected to the belt drive unit 2. FIG. 2 illustrates a configuration of the motor system 1000 according to the first embodiment of the present invention.

As illustrated in FIG. 2, a drive-side coupling part 204 is connected to the electric motor 1 and to a drive pulley 201. A belt 203 is wound in a loop around the drive pulley 201 and a driven pulley 202. A driven-side coupling part 205 is connected to the driven pulley 202 and to the load machine 5.

The belt drive unit 2 is defined by the drive pulley 201, the belt 203, and the driven pulley 202. Torque (in units of newton meters [Nm]) that is generated by the electric motor 1 is transmitted to the load machine 5 via the belt drive unit 2 (note that every unit in the embodiments of the present invention is given as an example). The load machine 5 is a mechanical device that is driven by the torque.

Rotation or the torque of the electric motor 1 is transmitted to the drive pulley 201 by the drive-side coupling part 204, and rotation or torque of the drive pulley 201 is transmitted to the driven pulley 202 by the belt 203. Rotation or torque of the driven pulley 202 is transmitted to the load machine 5 by the driven-side coupling part 205.

The belt 203, the drive pulley 201, and the driven pulley 202 may have teeth that mesh with each other to transmit the torque. Alternatively, the belt 203, the drive pulley 201, and the driven pulley 202 may have no teeth and transmit the torque by means of frictional force. A part between the electric motor 1 and a drive detector 3 is where detection by the drive detector 3 takes place and may be illustrated in FIG. 2. A drive command signal 51 may also be illustrated between the electric motor 1 and a drive controller 4.

The electric motor 1 may be connected directly to the belt drive unit 2 without the drive-side coupling part 204 being disposed therebetween. The belt drive unit 2 may be connected directly to the load machine 5 without the driven-side coupling part 205 being disposed therebetween. The drive-side coupling part 204 and the driven-side coupling part 205 may each include a belt, a pulley, and others.

A description will be made as to the motor control device 100. As illustrated in FIG. 1, the motor control device 100 includes the drive detector 3, the drive controller 4, and a belt tension state value calculation unit 6. An electronic computer or an electronic computer combined with a circuit may be used as the drive controller 4 and the belt tension state value calculation unit 6.

The drive detector 3, the drive controller 4, and the belt tension state value calculation unit 6, which are elements of the motor control device 100, may be connected directly or by wiring. Another alternative is that the connections may use a network such as an intranet or the Internet. A single electronic computer may use a plurality of different pieces of software to function, for example, as a plurality of the elements that include the drive controller 4 and the belt tension state value calculation unit 6.

A description will be made as to operation of the motor control device 100. The drive controller 4 outputs the drive command signal 51. The drive command signal 51 specifies torque to be generated by the electric motor 1 for drivingly controlling the electric motor 1. The drive command signal 51 that the drive controller 4 outputs may specify, instead of the torque of the electric motor 1, an angle of rotation (in units of radians [rad]) or an angular velocity (in units of radians per second [rad/s]) in the motor system 1000.

The rotation in the motor system 1000 refers to rotation of the element of the motor system 1000 that is attended by transmission of torque of the electric motor 1. For the electric motor 1, for example, the angle is an angle of rotation of a rotor of the electric motor 1. The angle of rotation or the angular velocity of any one of the electric motor 1, the drive pulley 201, the driven pulley 202, the load machine 5, the pulley of the drive-side coupling part 204, and the pulley of the driven-side coupling part 205 can be given as an example of the drive command signal 51.

On the basis of the drive command signal 51, the electric motor 1 generates the torque. The drive detector 3 detects the angle of the electric motor 1 and outputs its detection result as a drive detection signal 52. An encoder, for example, is usable as the drive detector 3. The drive detector 3 is also capable of detecting the angle of rotation, the angular velocity or an angular acceleration (in units of radians per second squared [rad/s$^2$]) in the motor system 1000 and outputting its detection result as the drive detection signal 52.

Given examples of the drive detection signal 52 include a detection value of the angle of rotation, the angular velocity, or the angular acceleration of any one of the electric motor 1, the drive pulley 201, the driven pulley 202, the load machine 5, the pulley of the drive-side coupling part 204, and the pulley of the driven-side coupling part 205. When the load machine 5 does not include any element that is rotated by the torque of the electric motor 1, the load machine 5 is excluded from the above given examples.

The drive detector 3 may be a velocity sensor for detecting the angular velocity. The drive detector 3 may be an acceleration sensor for detecting the angular acceleration. The drive detector 3 may be a combination of an encoder that detects the angle and a time derivative calculator, for detecting the angular velocity or the angular acceleration.

On the basis of the drive detection signal 52, the belt tension state value calculation unit 6 outputs a belt tension state value 53. The belt tension state value 53 in FIG. 1 refers to belt tension (in units of newtons [N]). The belt tension is hereinafter denoted by S. The belt tension state value calculation unit 6 is also capable of outputting, as the belt tension state value 53, a signal that correlates with the belt tension S so that a change in the belt tension S is detectable from a variation in the signal.

The belt tension state value calculation unit 6 is also capable of outputting, as the belt tension state value 53, a signal indicating a state of the belt tension S. Given examples of the belt tension state value 53 include a signal indicating whether a value of the belt tension S is within a predetermined normal range, an amplitude of the time-varying belt tension S, a maximum or a minimum value of the time-varying belt tension S, and an amount of change in the belt tension S from a result of detection immediately after installation of the belt 203, among others.

The belt tension state value 53 can also be output as, for example, a torsional vibration resonance frequency $f_r$, an amplitude of the time-varying torsional vibration resonance frequency $f_r$, or an amount of change in the torsional vibration resonance frequency $f_r$ from a result of detection of the torsional vibration resonance frequency $f_r$ immediately after the installation of the belt 203. It is to be noted that a change in the belt tension S is detectable also from a value change in the torsional vibration resonance frequency $f_r$ so that whether or not there is an anomaly is observed.

A description will be made below as to operation of the belt tension state value calculation unit 6. The belt 203 includes a characteristic (spring characteristic) of functioning as a spring connected between the drive pulley 201 and the driven pulley 202. Torsional stiffness emerging in this spring characteristic leads to a resonance phenomenon. A frequency at which this resonance phenomenon occurs is called the torsional vibration resonance frequency (in units of hertz [Hz]). The torsional vibration resonance frequency is hereinafter denoted by $f_r$.

The belt tension state value calculation unit 6 of FIG. 1 calculates the torsional vibration resonance frequency $f_r$ and calculates the belt tension S from the torsional vibration resonance frequency $f_r$. A description will be made first as to how the belt tension state value calculation unit 6 operates for calculating the torsional vibration resonance frequency $f_r$. The belt tension state value calculation unit 6 obtains, as the drive detection signal 52, the angle of the electric motor 1 that the drive detector 3 has detected. This angle is denoted by A(t). t is time (in units of seconds [s]).

The belt tension state value calculation unit 6 performs frequency analysis (such as a Fourier transform) on the angle (A(t)) to calculate frequency characteristics of the drive detection signal 52. To be specific, the frequency characteristics of the drive detection signal 52 that have been calculated by means of the Fourier transform are denoted by A(f).

f is a frequency (in units of hertz [Hz]). A frequency f that gives a maximum value of the frequency characteristics (A(f)) of the drive detection signal 52 is taken as the torsional vibration resonance frequency $f_r$ by the belt tension state value calculation unit 6. Operating as described above, the belt tension state value calculation unit 6 calculates the torsional vibration resonance frequency $f_r$. The frequency characteristics of the drive detection signal 52 are expressed by Formula (1).

[Formula 1]

$$A(f) \quad (1)$$

A description will be made next as to how the belt tension state value calculation unit 6 operates for calculating the belt tension S from the torsional vibration resonance frequency $f_r$. A spring constant that is characteristic of the torsional stiffness of the belt drive unit 2 is denoted by $K_{tor}$ (in units of newton meters per radian [Nm/rad]). Electric-motor-side inertia (in units of kilogram-meters squared [kgm²]) is denoted by $J_1$. The electric-motor-side inertia $J_1$ refers to inertia that the drive pulley 201, the drive-side coupling part 204, and the electric motor 1 have as a whole.

Load-machine-side inertia (in units of kilogram-meters squared [kgm²]) is denoted by $J_2$. The load-machine-side inertia $J_2$ refers to inertia that the driven pulley 202, the driven-side coupling part 205, and the load machine 5 have as a whole. Using Formula (2) below, the belt tension state value calculation unit 6 is capable of calculating the spring constant $K_{tor}$ from the torsional vibration resonance frequency $f_r$.

[Formula 2]

$$K_{tor} = \frac{(2\pi f_r)^2}{\left(\frac{1}{J_1} + \frac{1}{J_2}\right)} \quad (2)$$

Next, tensional stiffness of the belt 203 between the drive pulley 201 and the driven pulley 202 is denoted by $K_{ten}$ (in units of newtons per meter [N/m]). A radius of the drive pulley 201 is denoted by $R_1$ (in units of meters [m]), and a radius of the driven pulley 202 is denoted by $R_2$ (in units of meters [m]).

Using Formula (3) below, the belt tension state value calculation unit 6 is capable of determining the tensional stiffness $K_{ten}$ from the spring constant $K_{tor}$, which is characteristic of the torsional stiffness and has been determined with Formula (2), the radius $R_1$ of the drive pulley 201, and the radius $R_2$ of the driven pulley 202.

[Formula 3]

$$K_{ten} = \frac{K_{tor}}{2 \times R_1 \times R_2} \quad (3)$$

Figure 3:
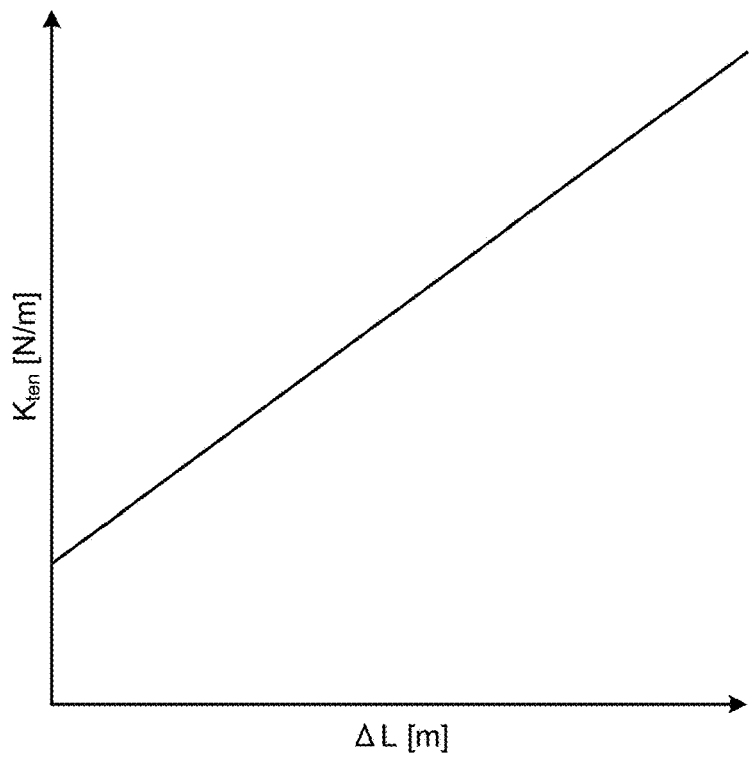
FIG. 3 illustrates a relationship between a stretch amount of a belt and tensional stiffness of the belt according to the first embodiment of the present invention.

FIG. 3 illustrates a relationship between a stretch amount ΔL of the belt 203 and the tensional stiffness $K_{ten}$ of the belt 203 according to the first embodiment of the present invention. ΔL used herein denotes the longitudinal stretch amount of the belt 203 (in units of meters [m]). The belt drive unit 2 of FIG. 1 has a linear relationship between the stretch amount ΔL and the tensional stiffness $K_{ten}$. A relationship that has one expressed by a linear expression of the other is referred to as a linear relationship here.

Figure 4:
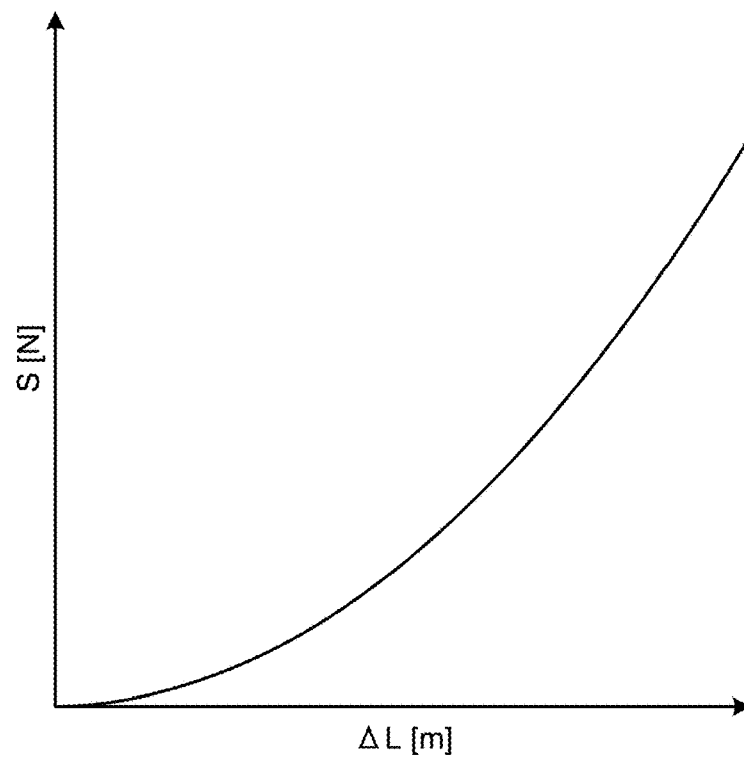
FIG. 4 illustrates a relationship between the stretch amount of the belt and belt tension according to the first embodiment of the present invention.

Using the linear relationship between the longitudinal stretch amount ΔL of the belt 203 and the tensional stiffness $K_{ten}$, the belt tension state value calculation unit 6 is capable of determining the stretch amount ΔL from the tensional stiffness $K_{ten}$ determined with Formula (3). FIG. 4 illustrates a relationship between the stretch amount ΔL of the belt 203 and the belt tension S according to the first embodiment of the present invention. The relationship illustrated in FIG. 4 may be determined by calculation from a material and a size of the belt 203.

As illustrated in FIG. 4, the belt drive unit 2 of FIG. 1 has a relationship between the belt tension S and the stretch amount ΔL, the relationship having the belt tension S expressed by a quadratic expression of the stretch amount ΔL. Using the relationship of FIG. 4 between the belt tension S and the stretch amount ΔL, the belt tension state value calculation unit 6 is capable of determining the belt tension S from the stretch amount ΔL determined with FIG. 3.

The relationship between the belt tension S and the stretch amount ΔL may be described in a table and may have interpolations. As described above, the belt tension S can be calculated from the torsional vibration resonance frequency $f_r$ with the use of Formulas (2) and (3) and FIGS. 3 and 4.

As explained above, the spring constant $K_{tor}$ characteristic of the torsional stiffness of the belt 203 is determined by substituting the measured torsional vibration resonance frequency $f_r$ into a formula. The formula expresses the relationship between the torsional vibration resonance frequency $f_r$ of the belt 203 and the spring constant $K_{tor}$ characteristic of the torsional stiffness, using the electric-motor-side inertia $J_1$ and the load-machine-side inertia $J_2$.

Subsequently, the belt's tensional stiffness $K_{ten}$ is determined from the relationship between the spring constant $K_{tor}$ characteristic of the torsional stiffness and the belt's tensional stiffness $K_{ten}$, the relationship being expressed by the geometric dimensions of the belt drive unit 2. Next, the stretch amount $\Delta L$ is determined from the relationship between the tensional stiffness $K_{ten}$ and the stretch amount $\Delta L$. Thereafter, the belt tension S is determinable from the relationship between the stretch amount $\Delta L$ and the belt tension S.

The above operation of the belt tension state value calculation unit 6 of FIG. 1 is one example. A description will be made next as to signal components included in the drive command signal 51 and the drive detection signal 52. The signal components hereinafter refer to frequency components. For example, a signal component for the torsional vibration resonance frequency $f_r$ refers to a signal component at a frequency that is the torsional vibration resonance frequency $f_r$.

When the drive command signal 51 in FIG. 1 includes the signal component for the torsional vibration resonance frequency $f_r$, the drive detector 3 can output the drive detection signal 52 more reliably including the signal component for the torsional vibration resonance frequency $f_r$. By using the signal component for the torsional vibration resonance frequency $f_r$ in the drive detection signal 52, the belt tension state value calculation unit 6 is capable of accurately detecting the state of the belt tension S.

When there is not a reference value such as a value predictive of the torsional vibration resonance frequency $f_r$, the drive controller 4 may output the drive command signal 51 having a frequency band that is wide enough to include the signal component for the torsional vibration resonance frequency $f_r$ so that the frequency characteristics of the drive detection signal 52 are calculated for determination of the torsional vibration resonance frequency $f_r$, as in the embodiment described with FIG. 1.

When the drive controller 4 outputs a plurality of the drive command signals 51 having different frequency bands, the belt tension state value calculation unit 6 is capable of determining the torsional vibration resonance frequency $f_r$ without calculating the frequency characteristics of the drive detection signal 52. An example below describes the operation when the drive controller 4 outputs the plurality of the drive command signals 51 having the different frequency bands.

The drive controller 4 outputs a time series of the drive command signals 51 with the frequency band changing in order. Consequently, a sequence of the drive detection signals 52 having the different frequency bands is output from the drive detector 3 in time order. The belt tension state value calculation unit 6 compares signal strengths of the obtained plurality of the drive detection signals 52 and selects the drive detection signal 52 that is highest in signal strength.

The belt tension state value calculation unit 6 also obtains, from the drive controller 4, data in which a time when each of the drive command signals 51 has been output is associated with the frequency band. Referring to the data, the belt tension state value calculation unit 6 determines the frequency band of the drive detection signal 52 having the highest signal strength. The belt tension state value calculation unit 6 takes the determined frequency band as a frequency band including the torsional vibration resonance frequency $f_r$.

Moreover, with use of Formulas (2) and (3) and FIGS. 3 and 4, the belt tensions S are determined. The frequency band corresponding to the determined belt tensions S can be output as the belt tension state value 53.

The frequency band, which includes the torsional vibration resonance frequency $f_r$ as a state of torsional vibration of the belt drive unit 2, is detected from the drive detection signal 52 which is the result of detection of the rotation in the motor system 1000. On the basis of a result of detection of this frequency band, the belt tension state value 53 may be output. It is to be noted that in the present embodiment illustrated in FIG. 1, the state of the torsional vibration is a signal or data obtained from the drive detection signal 52 and used in calculation of the belt tension state value 53.

Given examples of the state of the torsional vibration in the present embodiment include a time waveform of the drive detection signal 52, the frequency characteristics obtained by the Fourier transform of the drive detection signal 52, the measured torsional vibration resonance frequency $f_r$, and an upper or a lower limit of the frequency band including the measured torsional vibration resonance frequency $f_r$, among others.

The belt tension state value calculation unit 6 is also capable of obtaining the frequency characteristics of the drive detection signal 52 without using the Fourier transform. Given examples of operation for calculating the frequency characteristics without using the Fourier transform include extracting signal components within a predetermined frequency range, and performing sampling to obtain signal components at predetermined frequencies, among others. An example is given of the operation of the belt tension state value calculation unit 6 when the above predetermined signal components are extracted.

A signal including the signal component for the torsional vibration resonance frequency $f_r$ of the belt drive unit 2 is extracted from the drive detection signal 52, and strength of the extracted signal is detected. When the strength of this signal is below a predetermined value, a signal indicating an anomaly in the belt tension S is output as the belt tension state value 53. In this way, the belt tension state value calculation unit 6 may obtain the frequency characteristics of the drive detection signal 52 to output the belt tension state value 53.

Even when one or more of the elements of the motor control device 100 are provided to be separate from and external to a device including the belt tension state value calculation unit 6, the state of the belt tension S is detectable as in the motor control device 100 of FIG. 1. Given examples of a configuration having the one or more external elements include a motor control device externally provided with the drive detector 3 of FIG. 1, and a device externally provided with the drive controller 4 of FIG. 1, among others. The device externally provided with the drive controller 4 is hereinafter called "belt tension state detection device".

When the drive detector 3 outputs the drive detection signal 52, the frequency band of the drive command signal 51 may be different than the frequency band of the drive command signal 51 when the drive detector 3 does not output the drive detection signal 52. The drive detection signal 52 is used in calculation of the belt tension state value 53. When the drive detector 3 is to output the drive detection signal 52, the drive controller 4 preferably outputs the drive command signal 51 that includes the signal component for the torsional vibration resonance frequency $f_r$ in order for the belt tension state value calculation unit 6 to output the belt tension state value 53. When, on the other hand, the drive detector 3 is to output no drive detection signal 52, the belt tension state value calculation unit 6 does not need to calculate the belt tension state value 53. This enables the drive controller 4 to select a frequency band of the drive command signal 51 without constraints.

Accordingly, when the drive detector 3 is to output no drive detection signal 52, the drive controller 4 may output the drive command signal 51 having the frequency band suitable for operation of the electric motor 1 in order to allow the electric motor 1 to have improved energy efficiency while the drive detection signal 52 is not detected. Because of the improved energy efficiency, the electric motor 1 may, then, be operated for a shorter time.

Assume that the energy efficiency is highest when the motor system 1000 is operated for the purpose of achieving desired operation, for example, at a frequency lower than the torsional vibration resonance frequency $f_r$. In such a case, the drive controller 4 may output the drive command signal 51 including the torsional vibration resonance frequency $f_r$ only when the drive detector 3 is to output the drive detection signal 52. When the drive detector 3 is to output no drive detection signal 52, the drive controller 4 may output the drive command signal 51 having the lower frequency that does not include the torsional vibration resonance frequency $f_r$.

According to each of Patent Literatures 2 and 3, the belt tension is detected through detection of a resonance phenomenon occurring with lateral vibration of the belt (vibration in a direction perpendicular to a running direction of the belt 203). By contrast, the motor control device 100 according to the present embodiment uses the resonance phenomenon occurring with longitudinal vibration (vibration in a direction parallel to a running direction of the belt 203) to calculate the belt tension state value 53. A longitudinal vibration resonance frequency is higher than a lateral vibration resonance frequency. Therefore, compared with a device that uses a resonance phenomenon occurring with the lateral vibration in detection, the motor control device 100 is less susceptible to ambient noise and thus does not easily have erroneous detections.

The motor control device 100 of FIG. 1 is capable of detecting the state of the belt tension S from the result of detection of the rotation in the motor system 1000. Therefore, a new detector such as a strain sensor, a pressure sensing device, or a transducer is not required for detecting the state of the belt tension S in addition to the device that detects the rotation.

Installing the strain sensor, the pressure sensing device, the transducer, or the like causes a motor system to have constraints in the form of, for example, wiring and an installation space for such a detector. Applying the motor control device 100 to a motor system, on the other hand, does not require a detector such as the transducer and thus does not cause the motor system to have the above constraints. Therefore, the motor control device 100 is capable of detecting the state of the belt tension through use of the device, which is small-sized or simple.

Since the motor control device 100 only needs to detect the rotation of the constituent element of the motor system 1000, positioning its detector away from the belt 203 is possible. This enables the small-sized or simple device to be used in the detection of the state of the belt tension.

When the detector that detects the rotation in the motor system 1000 is provided for control of the electric motor 1, this detector provided for such control is usable as the drive detector 3. There is no need to provide a new detector that detects the state of the belt tension. Therefore, the motor control device 100 is capable of detecting the state of the belt tension through use of the small-sized or simple device.

The motor control device 100 of FIG. 1 is capable of detecting the state of the belt tension S without being provided with a new vibration means that produces the lateral vibration. Therefore, the state of the belt tension is detectable through use of the small-sized or simple device.

As described above, the motor control device 100 includes the drive controller 4 that outputs the drive command signal 51 that drives the electric motor 1 of the motor system 1000. The motor system 1000 includes the load machine 5, the driven pulley 202 mechanically connected to the load machine 5, the belt 203 wound on the driven pulley 202, the drive pulley 201 having the belt 203 wound thereon, and the electric motor 1 mechanically connected to the drive pulley 201.

The motor control device 100 also includes the belt tension state value calculation unit 6. On the basis of the drive detection signal 52 detecting the angle of rotation, the angular velocity, or the angular acceleration in the motor system 1000, the belt tension state value calculation unit 6 outputs the belt tension state value 53 indicating the state of the belt tension in the belt 203.

The belt tension state value calculation unit 6 illustrated in FIG. 1 may output the belt tension state value 53 on the basis of the result of detection of the state of the torsional vibration that emerges in the drive detection signal 52. The belt tension state value 53 may be output on the basis of the frequency characteristics of the drive detection signal 52. The belt tension state value 53 may be output on the basis of the result of detection of the torsional vibration resonance frequency $f_r$ that emerges in the drive detection signal 52.

The frequency band including the signal component for the torsional vibration resonance frequency $f_r$ may be determined, and a range of possible values of the belt tension S determined from the determined frequency band may be output as the belt tension state value 53. The torsional vibration resonance frequency $f_r$ may be determined, and the value of the belt tension S calculated from the determined torsional vibration resonance frequency $f_r$ may be output as the belt tension state value 53.

The belt tension state value calculation unit 6 illustrated in FIG. 1 may detect a change in the state of the belt tension S from any one of a change in the state of the torsional vibration, a change in the frequency characteristics, and a change in the torsional vibration resonance frequency $f_r$.

The present embodiment enables the belt tension to be determined from the detection result of the sensor that detects the rotation of, for example, the electric motor. The motor control device or the belt tension state detection device is, therefore, capable of detecting, through use of the small-sized or simple device, the state of the belt tension in the belt transmitting the torque of the electric motor in the motor system.

Second Embodiment

Figure 5:
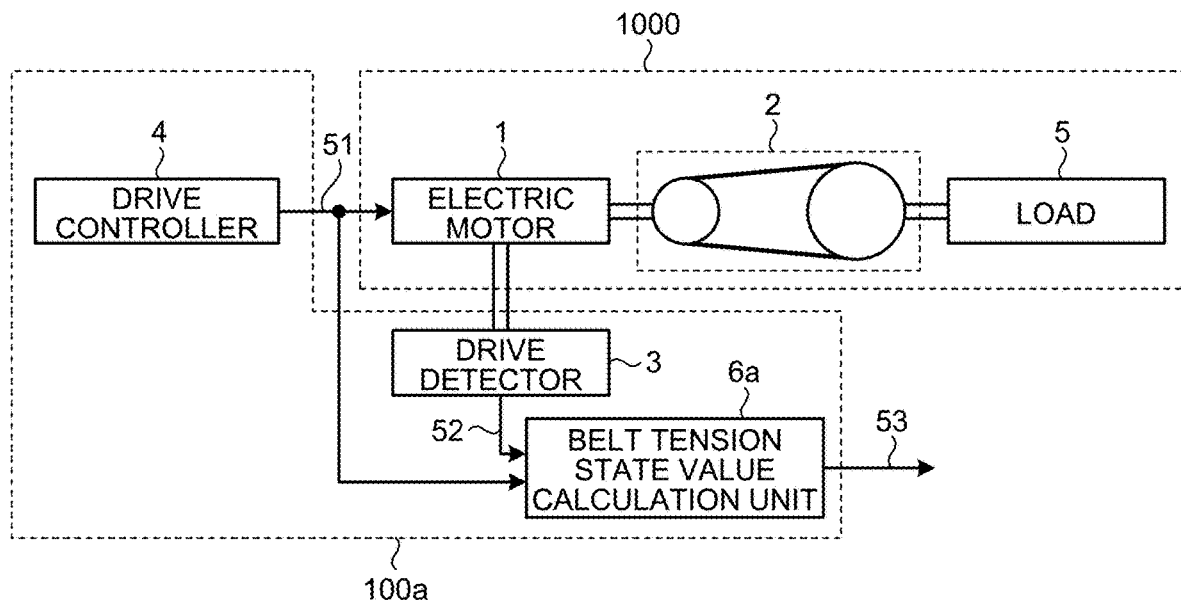
FIG. 5 is a block diagram illustrating a configuration of a motor control device according to a second embodiment of the present invention.

FIG. 5 is a block diagram illustrating a configuration of a motor control device 100a according to the second embodiment of the present invention. The motor control device 100a differs from the FIG. 1 motor control device 100 according to the first embodiment in including a belt tension state value calculation unit 6a in place of the belt tension state value calculation unit 6.

The belt tension state value calculation unit 6 of FIG. 1 outputs the belt tension state value 53 on the basis of the drive detection signal 52. The belt tension state value calculation unit 6a illustrated in FIG. 5, on the other hand, outputs the belt tension state value 53 on the basis of the drive command signal 51 and the drive detection signal 52.

In a description of the motor control device 100a illustrated in FIG. 5, those elements that are identical or correspond to the elements of the FIG. 1 motor control device 100 according to the first embodiment have the same reference characters. With reference to FIG. 5, a description will be made as to operation of the motor control device 100a.

As with the belt tension state value calculation unit 6 of FIG. 1, the belt tension state value calculation unit 6a obtains the drive detection signal 52 and calculates A(f) in Formula (1). A(f) in Formula (1) is the frequency characteristics of the drive detection signal 52. The belt tension state value calculation unit 6a also obtains the drive command signal 51. The drive command signal 51 specifies torque to be generated by the electric motor 1 for drivingly controlling the electric motor 1. This torque is denoted by T(t).

The belt tension state value calculation unit 6a performs frequency analysis using a Fourier transform on the drive command signal 51 to obtain Formula (4) from the torque T(t). T(f) in Formula (4) represents frequency characteristics of the drive command signal 51 that are obtained by the Fourier transform. The belt tension state value calculation unit 6a obtains Formula (5) by dividing the frequency characteristics of the drive detection signal 52 by the frequency characteristics of the drive command signal 51.

The belt tension state value calculation unit 6a determines the torsional vibration resonance frequency $f_r$ by taking a frequency f that gives a maximum value of Formula (5), as the torsional vibration resonance frequency $f_r$. In other words, the ratio of the frequency characteristics of the drive detection signal 52 to the frequency characteristics of the drive command signal 51 is taken. The frequency f giving the maximum value of the above ratio is then taken as the torsional vibration resonance frequency $f_r$.

[Formula 4]

$$T(f) \quad (4)$$

[Formula 5]

$$\frac{A(f)}{T(f)} \quad (5)$$

Using Formulas (2) and (3) and FIGS. 3 and 4, the belt tension state value calculation unit 6a of FIG. 5 calculates the belt tension S from the torsional vibration resonance frequency $f_r$ as with the belt tension state value calculation unit 6 of FIG. 1. The result of calculation is then output as the belt tension state value 53. The above operation is performed by the belt tension state value calculation unit 6a of FIG. 5.

The frequency characteristics of the drive detection signal 52 change depending on the frequency characteristics of the drive command signal 51. By taking the frequency f that gives the maximum value of Formula (5) as the torsional vibration resonance frequency $f_r$, the belt tension state value calculation unit 6a of FIG. 5 provides the advantage that the result of calculation of the torsional vibration resonance frequency $f_r$ is less affected by variations in the frequency characteristics of the drive command signal 51.

Therefore, accurate calculation of the torsional vibration resonance frequency $f_r$ is enabled. Accurate calculation of the belt tension S, then, is enabled. The motor control device 100a of FIG. 5 produces a significant effect particularly when the frequency characteristics of the drive command signal 51 show great frequency-dependent variations around the torsional vibration resonance frequency $f_r$.

The belt tension state value calculation unit 6a is capable of accurately calculating the belt tension state value 53 even when using a detection value of current flowing in the electric motor 1 or a detection value of torque generated by the electric motor 1 in place of the drive command signal 51.

Even when one or more of those elements of the motor control device 100a are provided to be separate from and external to a device including the belt tension state value calculation unit 6a, a state of the belt tension S is accurately detectable as in the motor control device 100a. Given examples of the device that includes the belt tension state value calculation unit 6a while being externally provided with the one or more constituent elements include a motor control device externally provided with the FIG. 5 drive detector 3, and a belt tension state detection device externally provided with the FIG. 5 drive controller 4, among others.

As with the belt tension state value calculation unit 6 according to the first embodiment, the belt tension state value calculation unit 6a is also capable of, as required, outputting a signal indicating the state of the belt tension S as the belt tension state value 53 in place of a value of the belt tension S. The belt tension state value calculation unit 6a is also capable of outputting, as the belt tension state value 53, a signal that correlates with the belt tension S so that a change in the belt tension S is detectable from a variation in the signal.

Given examples of the belt tension state value 53 include a signal indicating whether the value of the belt tension S is within a predetermined normal range, an amplitude of the time-varying belt tension S, a maximum or a minimum value of the time-varying belt tension S, and an amount of change in the belt tension S from a result of detection immediately after installation of the belt 203, among others.

The belt tension state value 53 to be output can also be, for example, the torsional vibration resonance frequency $f_r$, an amplitude of the time-varying torsional vibration resonance frequency $f_r$, or an amount of change in the torsional vibration resonance frequency $f_r$ from a result of detection of the torsional vibration resonance frequency $f_r$ immediately after the installation of the belt 203. A change in the belt tension S may be detected from a value change in the torsional vibration resonance frequency $f_r$ so that whether or not there is an anomaly is observed.

As in the operation of the motor control device 100 described in the first embodiment, even the FIG. 5 drive controller 4 of the motor control device 100a is capable of operation such that a plurality of the drive command signals 51 having different frequency bands are output at different times. This enables accurate output of the belt tension state value 53 without use of the frequency characteristics of the drive command signal 51 and the frequency characteristics of the drive detection signal 52.

As described above, the belt tension state value calculation unit 6a outputs the belt tension state value 53 on the basis of the drive command signal 51 and the drive detection signal 52. Alternatively, the belt tension state value calculation unit 6a outputs the belt tension state value 53 on the basis of the drive command signal 51 and the detection value of the current in the electric motor 1 or the detection value of the torque of the electric motor 1.

The belt tension state value calculation unit 6a illustrated in FIG. 5 takes the ratio of the frequency characteristics of the drive detection signal 52 to the frequency characteristics of any one of the drive command signal 51, the detection value of the current in the electric motor 1, and the detection value of the torque of the electric motor 1. The belt tension state value 53 based on this ratio may then be output. The belt tension state value 53 may be output on the basis of a result of detection of a state of torsional vibration that emerges in this ratio.

In the present embodiment illustrated in FIG. 5, the state of the torsional vibration is a signal or data obtained from the drive detection signal 52 and the drive command signal 51 and used in calculation of the belt tension state value 53.

Given examples of the state of the torsional vibration in the present embodiment include a time waveform of any one of the drive detection signal 52, the drive command signal 51, the detection value of the torque of the electric motor 1, and the detection value of the current in the electric motor 1 and the frequency characteristics obtained by the Fourier transform of any one of the drive detection signal 52, the drive command signal 51, the detection value of the torque of the electric motor 1, and the detection value of the current in the electric motor 1. The measured torsional vibration resonance frequency $f_r$, and an upper or a lower limit of a frequency band including the measured torsional vibration resonance frequency $f_r$ are also included in the given examples.

The torsional vibration resonance frequency $f_r$ may be determined by taking the frequency that gives the maximum value of the ratio, as the torsional vibration resonance frequency $f_r$, and the belt tension S determined from the determined torsional vibration resonance frequency $f_r$ may be output as the belt tension state value 53.

A frequency band including a signal component for the torsional vibration resonance frequency $f_r$ may be determined from this ratio, and a range of possible values of the belt tension S determined from the determined frequency band may be output as the belt tension state value 53. The torsional vibration resonance frequency $f_r$ may be determined from the ratio, and the value of the belt tension S calculated from the determined torsional vibration resonance frequency $f_r$ may be output as the belt tension state value 53.

The motor control device or the belt tension state detection device that is provided according to the present embodiment is capable of detecting, through use of the small-sized or simple device, the state of the belt tension in the belt transmitting the torque of the electric motor in the motor system. Moreover, accurate detection of the state of the belt tension is enabled.

Third Embodiment

Figure 6:
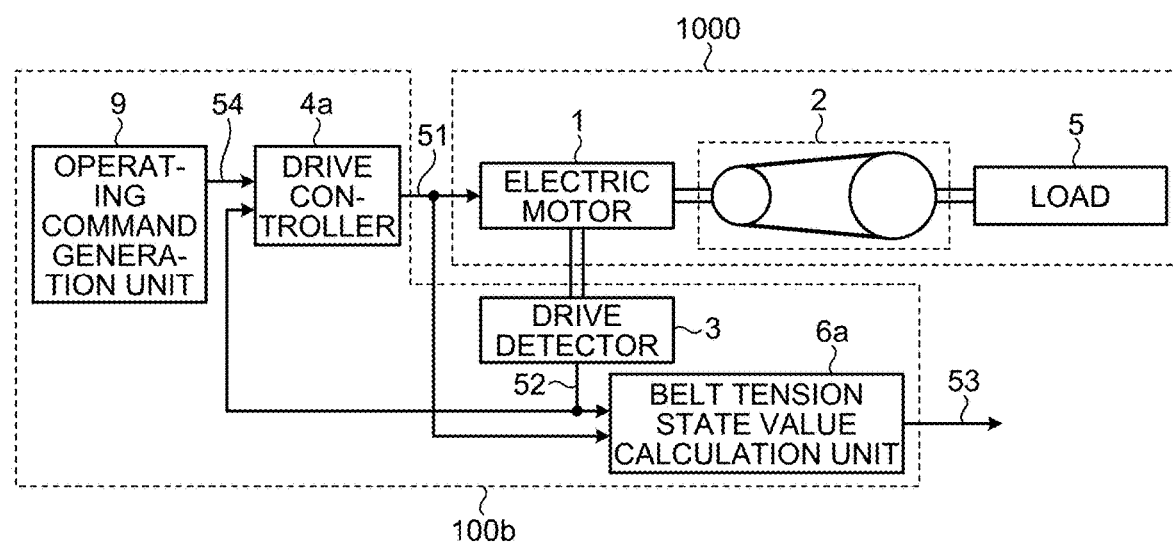
FIG. 6 is a block diagram illustrating a configuration of a motor control device according to a third embodiment of the present invention.

FIG. 6 is a block diagram illustrating a configuration of a motor control device 100b according to the third embodiment of the present invention. The motor control device 100b of FIG. 6 differs from the FIG. 5 motor control device 100a according to the second embodiment in including an operating command generation unit 9. The motor control device 100b of FIG. 6 also differs from the motor control device 100a of FIG. 5 in including a drive controller 4a in place of the drive controller 4.

On the basis of the drive detection signal 52 and an operating command signal 54 that is output from the operating command generation unit 9, the drive controller 4a of FIG. 6 outputs the drive command signal 51 and thus causes operation of the electric motor 1 to follow the operating command signal 54 for feedback control.

In a description of the motor control device 100b of FIG. 6 according to the third embodiment, those elements that are identical or correspond to the constituent elements of the FIG. 5 motor control device 100a according to the second embodiment have the same reference characters. With reference to FIG. 6, a description will be made as to operation of the motor control device 100b. The operating command generation unit 9 outputs the operating command signal 54. The operating command signal 54 is a command value for the operation of the electric motor 1 and serves as a target to be used in generation of the drive command signal 51. An electronic computer, for example, is usable as the operating command generation unit 9.

The operating command signal 54 in FIG. 6 is a torque command value for rotation of the electric motor 1. On the basis of the operating command signal 54 and the drive detection signal 52, the drive controller 4a outputs the drive command signal 51 specifying the operation of the electric motor 1 and thus causes torque that the electric motor 1 generates to follow the operating command signal 54. In other words, outputting the drive command signal 51 causes the electric motor 1 to operate in such a manner as to reduce a difference between the operating command signal 54 and the torque of the electric motor 1. The belt tension state value calculation unit 6a of FIG. 6 outputs the belt tension state value 53 as with the FIG. 5 belt tension state value calculation unit 6a according to the second embodiment.

The motor control device 100b of FIG. 6 is capable of the feedback control for the motor system 1000 and is capable of detecting a state of the belt tension S. The motor control device 100b produces a significant effect when the motor system 1000 requires the feedback control. Given examples of when the feedback control is required include: when operation of the motor system 1000 is strongly affected by disturbance; and when the operation of the motor system 1000 is highly accurate, among others.

It is to be noted that the operating command signal 54 is not limited to the command value indicating torque to be generated by the electric motor 1. The operating command signal 54 may be a command value indicating an angle of rotation or an angular velocity for the motor system 1000. Given examples of the operating command signal 54 include the command value indicating the angle of rotation or the angular velocity for any one of the electric motor 1, the drive pulley 201, the driven pulley 202, the load machine 5, the pulley of the drive-side coupling part 204, and the pulley of the driven-side coupling part 205.

When the operating command signal 54 is the command value indicating the angle of rotation or the angular velocity of any element other than the electric motor 1, the drive controller 4a may convert the operating command signal 54 into a command value for the rotation of the electric motor 1. The electric motor 1 may then follow the converted command value in order for the rotation of the electric motor 1 to follow the operating command signal 54.

In the present embodiment, the operation of the electric motor 1 follows the operating command signal 54; however, the operation of the electric motor 1 is not limited to conforming to the operating command signal 54 at all times.

For example, the operation may be such that an error that has occurred between the operating command signal 54 and the operation of the electric motor 1 during the operation is eliminated in a stopping time. As in the example of the operation of the drive controller 4 that has been described in the first embodiment, the drive controller 4a of FIG. 6 may operate to change a frequency band of the drive command signal 51 in a time-dependent manner for improved operating efficiency of the electric motor 1.

As with the drive controller 4 according to the first embodiment, the drive controller 4a of FIG. 6 is capable of outputting, as the drive command signal 51, the angle of rotation or the angular velocity for the motor system 1000. The motor control device 100 according to the first embodiment may additionally include the operating command generation unit 9 to provide a motor control device that includes a feedback control system and is capable of detecting the state of the belt tension S as with the motor control device 100b of FIG. 6.

Even when one or more of those constituent elements of the FIG. 6 motor control device 100b are provided to be separate from and external to a device including the belt tension state value calculation unit 6a, a motor control device including the feedback control system is capable of detecting the state of the belt tension S as with the motor control device 100b.

Given examples of the device including the belt tension state value calculation unit 6a and having one or more elements provided externally thereof include a motor control device externally provided with the drive detector 3, and a belt tension state detection device externally provided with the drive controller 4a or the operating command generation unit 9, among others.

As described above, the motor control device 100b also includes the operating command generation unit 9 that outputs the operating command signal 54. The operating command signal 54 is the command for the operation of the electric motor 1 and serves as the target to be used in generation of the drive command signal 51. On the basis of the operating command signal 54 and the drive detection signal 52, the drive controller 4a outputs the drive command signal 51 that causes the electric motor 1 to follow the operating command signal 54.

The motor control device or the belt tension state detection device that is provided according to the present embodiment is capable of detecting, through use of the small-sized or simple device, the state of the belt tension in the belt transmitting the torque of the electric motor in the motor system. Even when the motor control device includes the feedback control system, the motor control device is capable of detecting the state of the belt tension.

Fourth Embodiment

Figure 7:
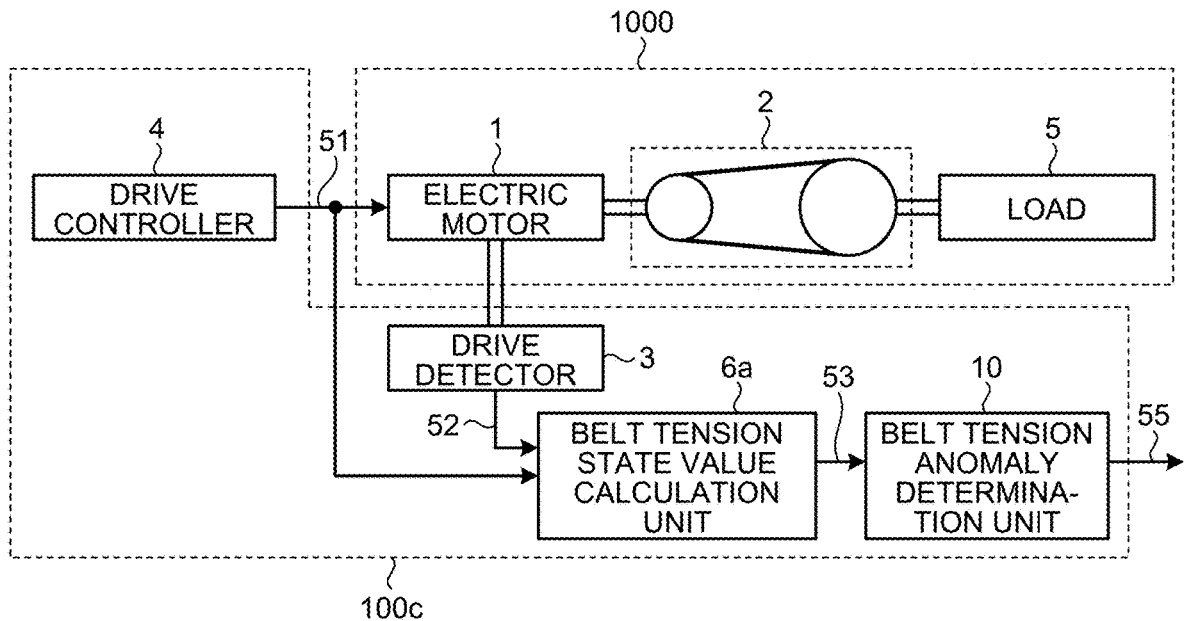
FIG. 7 is a block diagram illustrating a configuration of a motor control device according to a fourth embodiment of the present invention.

FIG. 7 is a block diagram illustrating a configuration of a motor control device 100c according to the fourth embodiment of the present invention. The motor control device 100c differs from the FIG. 5 motor control device 100a according to the second embodiment in including a belt tension anomaly determination unit 10. The belt tension anomaly determination unit 10 compares the belt tension state value 53 with a reference value, and on the basis of a comparison result, outputs a signal indicating whether a state of the belt tension is normal or anomalous. In a description of the motor control device 100c illustrated in FIG. 7, those elements that are identical or correspond to the constituent elements of the motor control device 100a have the same reference characters.

A comparator circuit and a signal output circuit that outputs a signal in accordance with an output of the comparator circuit may be used as the belt tension anomaly determination unit 10. Alternatively, an electronic computer may be used. With reference to FIG. 7, a description will be made as to operation of the motor control device 100c. The belt tension anomaly determination unit 10 compares the belt tension state value 53 with the predetermined reference value, and on the basis of the comparison result, outputs the belt tension anomaly determination value 55 indicating whether the state of the belt tension S is normal or anomalous.

A lower limit determination value or an upper limit determination value may be determined as the reference value. Alternatively, both the lower limit determination value and the upper limit determination value may be determined. The lower limit determination value is a lower limit of a normal range of the belt tension state values 53. The upper limit determination value is an upper limit of the normal range of the belt tension state values 53. These reference values may be determined on the basis of an experiment or calculation. As in the first embodiment, the belt tension state value 53 according to the present embodiment may be a value indicating the state of the belt tension S instead of the belt tension S.

An example is given of operation of the belt tension anomaly determination unit 10 having the lower limit determination value predetermined. When the belt tension state value 53 is below the lower limit determination value, the signal to be output may indicate an anomaly. When the belt tension state value 53 is equal to or above the lower limit determination value, the signal to be output may indicate normal.

An example is given of operation of the belt tension anomaly determination unit 10 having the upper limit determination value predetermined. When the belt tension state value 53 is above the upper limit determination value, the signal to be output may indicate an anomaly. When the belt tension state value 53 is equal to or below the upper limit determination value, the signal to be output may indicate normal.

An example is given of operation of the belt tension anomaly determination unit 10 having both the upper limit determination value and the lower limit determination value predetermined. When the belt tension state value 53 is above the upper limit determination value, the signal to be output by the belt tension anomaly determination unit 10 may indicate that the belt tension state value 53 is above the upper limit of the normal range. When the belt tension state value 53 is below the lower limit determination value, the signal to be output may indicate that the belt tension state value 53 is below the lower limit of the normal range.

When the belt tension state value 53 is equal to the lower or upper limit determination value or between the lower limit determination value and the upper limit determination value, the signal to be output may indicate that the belt tension state value 53 is within the normal range. The above example is the operation of the belt tension anomaly determination unit 10 having both the upper limit determination value and the lower limit determination value predetermined.

Since the belt tension anomaly determination value 55 is output indicating whether the state of the belt tension S is normal or anomalous, the motor control device 100c is capable of more reliably or easily detecting the anomaly in the belt tension S. It is to be noted that the motor control device 100 or the motor control device 100b may additionally include the belt tension anomaly determination unit 10 of FIG. 7 to more reliably or easily detect an anomaly in the state of the belt tension S.

Even when one or more of those elements of the motor control device 100c are provided to be separate from and external to a device including the belt tension state value calculation unit 6a, an anomaly in the state of the belt tension S is more reliably or easily detectable. Given examples of the device including the belt tension state value calculation unit 6a and having one or more elements provided externally thereof include a belt tension state detection device externally provided with the drive controller 4 of FIG. 7, among others.

As described above, the motor control device 100c also includes the belt tension anomaly determination unit 10. The belt tension anomaly determination unit 10 compares the predetermined reference value and the belt tension state value 53 and, on the basis of the comparison result, outputs the belt tension anomaly determination value 55 indicating whether the state of the belt tension S in the belt 203 is normal or anomalous.

The motor control device or the belt tension state detection device that is provided according to the present embodiment is capable of detecting, through use of the small-sized or simple device, the state of the belt tension in the belt transmitting torque of the electric motor in the motor system. Moreover, the anomaly in the state of the belt tension is more reliably or easily detectable.

Fifth Embodiment

Figure 8:
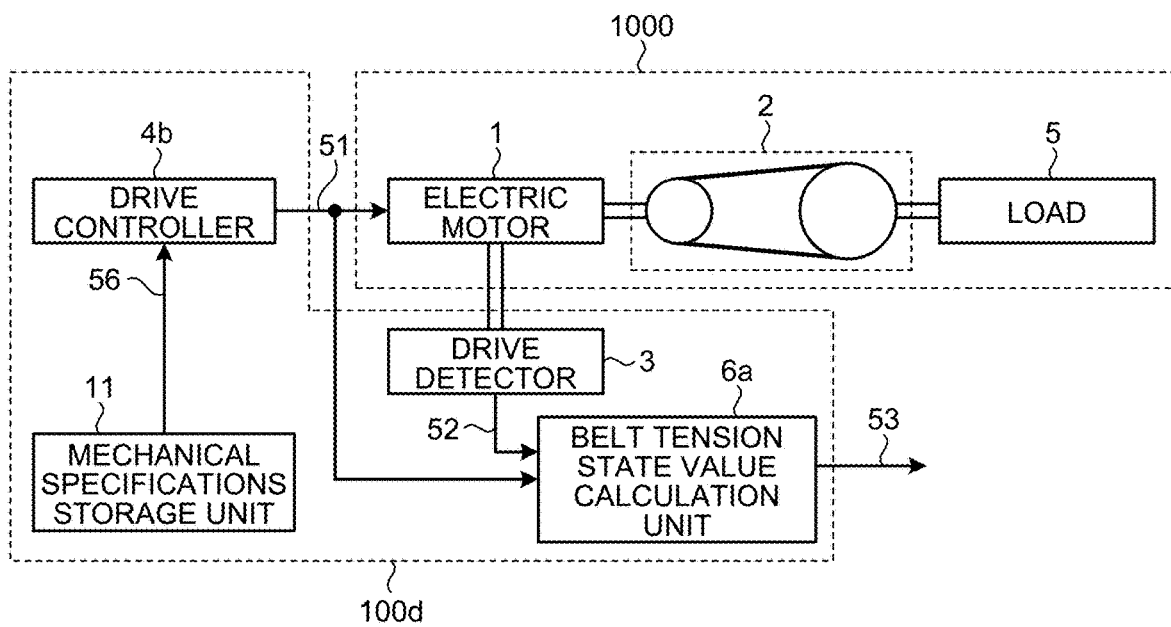
FIG. 8 is a block diagram illustrating a configuration of a motor control device according to a fifth embodiment of the present invention.

FIG. 8 is a block diagram illustrating a configuration of a motor control device 100d according to the fifth embodiment of the present invention. The motor control device 100d illustrated in FIG. 8 differs from the motor control device 100a of FIG. 5 according to the second embodiment in including a mechanical specifications storage unit (first mechanical specifications storage unit) 11. The motor control device 100d of FIG. 8 further differs from the motor control device 100a in including a drive controller 4b in place of the drive controller 4. The drive controller 4b outputs the drive command signal 51 on the basis of mechanical specifications 56 of the motor system 1000.

In a description of the motor control device 100d illustrated in FIG. 8, those elements that are identical or correspond to the constituent elements of the motor control device 100a according to the second embodiment have the same reference characters. The mechanical specifications storage unit 11 may be, for example, a storage medium such as a semiconductor memory or a hard disk. A computer with storage may also be used. With reference to FIG. 8, a description will be made as to operation of the motor control device 100d.

The mechanical specifications storage unit 11 stores the mechanical specifications (first mechanical specifications) 56. The mechanical specifications 56 include the belt tension S that has been obtained (initially) when the belt 203 has been installed, characteristics of the belt 203, a radius of the drive pulley 201, a radius of the driven pulley 202, the electric-motor-side inertia $J_1$, and the load-machine-side inertia $J_2$, among others. The mechanical specifications 56 are mechanical characteristic values of the motor system 1000 that are relevant to a state of torsional vibration in the belt 203. On the basis of the mechanical specifications 56 output from the mechanical specifications storage unit 11, the drive controller 4b outputs the drive command signal 51.

A description will be made as to operation of the drive controller 4b. The drive controller 4b calculates a predictive resonance frequency (first predictive resonance frequency) 58 that is a value predictive of the torsional vibration resonance frequency $f_r$ of the belt drive unit 2. By outputting the drive command signal 51 that includes a signal component for the predictive resonance frequency 58, the drive controller 4b is capable of more reliably outputting the drive command signal 51 including a signal component for the torsional vibration resonance frequency $f_r$.

Accordingly, each of the drive command signal 51 and the drive detection signal 52 that the belt tension state value calculation unit 6a of FIG. 8 obtains more reliably includes the signal component for the torsional vibration resonance frequency $f_r$. The motor control device 100d is, therefore, capable of more reliably detecting the state of the torsional vibration. More reliable detection of a state of the belt tension S, then, is enabled.

The drive controller 4b sets the frequency band of the drive command signal 51, using the predictive resonance frequency 58, such that the drive command signal 51 including the signal component for the torsional vibration resonance frequency $f_r$ has a narrower frequency band. This enables each of the drive command signal 51 and the drive detection signal 52 to have a reduced amount of noise when the belt tension state value 53 is calculated. The motor control device 100d is, therefore, capable of accurately detecting the state of the belt tension S.

It is to be noted that any one of the motor control devices 100, 100b, and 100c may additionally include the mechanical specifications storage unit 11 to more reliably or accurately detect the state of the belt tension S as with the motor control device 100d.

The mechanical specifications 56 stored in the mechanical specifications storage unit 11 are not limited to the initial values and may be values obtained after a lapse of time since the installation of the belt 203. The mechanical specifications 56 may be updated after certain lapses of time. The mechanical specifications 56 may be such that a plurality of the values are obtained and stored at different points of time and that an average value of the stored plurality of the values is used.

On the basis of the mechanical specifications 56, the drive controller 4b may determine signal specifications of the drive command signal 51 that include a width of the frequency band, a data interval, a data count per unit time, and a duration of signal outputting, among others. For example, using the mechanical specifications 56, the drive controller 4b may determine the signal specifications of the drive command signal 51 from accuracy required of the belt tension state value 53. A description will be made below as to a specific operation of the drive controller 4b in determination of the signal specifications of the drive command signal 51.

When whether or not a value of the belt tension S is within a predetermined allowable range of the belt tensions S is to be detected, the mechanical specifications 56 are used to calculate an allowable range of the torsional vibration resonance frequencies $f_r$ from the predetermined allowable range of the belt tensions S. The signal specifications of the drive command signal 51 are then determined from a width of the allowable range of the torsional vibration resonance frequencies $f_r$.

In determining the signal specifications of the drive command signal 51, the data count per unit time and the width of the frequency band, for example, are determined in such a manner as to enable determination of whether or not the measured torsional vibration resonance frequency $f_r$ falls within the allowable range. In this way, the drive controller 4b may output the drive command signal 51 without calculating the predictive resonance frequency 58.

While performing the above operation given as an example, the drive controller 4b may cause the drive command signal 51 including the signal component for the torsional vibration resonance frequency $f_r$ to have a narrower frequency band. This may result in more reliable output of the drive command signal 51 including the signal component for the torsional vibration resonance frequency $f_r$. The motor control device 100d then may similarly detect the state of the belt tension S more reliably or accurately.

As with the drive controller 4 according to the first embodiment, the drive controller 4b according to the present embodiment is also capable of outputting, instead of torque to be generated by the electric motor 1, an angle of rotation or an angular velocity for the motor system 1000 as the drive command signal 51.

Even when one or more of those elements of the motor control device 100d are provided to be separate from and external to a device including the belt tension state value calculation unit 6a, the state of the belt tension S is accurately or more reliably detectable as in the motor control device 100d.

Given examples of the device including the belt tension state value calculation unit 6a and having one or more elements provided externally thereof include a motor control device externally provided with the drive detector 3 of FIG. 8 or the mechanical specifications storage unit 11 of FIG. 8, and a belt tension state detection device externally provided with the drive controller 4b of FIG. 8, among others.

As described above, the drive controller 4b outputs the drive command signal 51 on the basis of the mechanical specifications 56 of the motor system 1000 that are relevant to the state of the torsional vibration in the belt 203. The mechanical specifications 56 are stored in and output from the mechanical specifications storage unit 11.

The drive controller 4b may output the drive command signal 51 including the signal component for the predictive resonance frequency 58, by calculating, from the mechanical specifications 56, the predictive resonance frequency 58 that is the value predictive of the torsional vibration resonance frequency $f_r$. The drive command signal 51 may have the signal specifications determined on the basis of the mechanical specifications 56 so that the drive command signal 51 is output in accordance with the determined signal specifications. The signal specifications are, for example, the width of the frequency band, the data interval, the data count per unit time, and the duration of signal outputting.

When the drive controller 4b determines the signal specifications, the state of the torsional vibration may be associated with the state of the belt tension S on the basis of the mechanical specifications 56, that is to say, through use of the mechanical specifications 56.

The motor control device or the belt tension state detection device that is provided according to the present embodiment is capable of detecting, through use of the small-sized or simple device, the state of the belt tension in the belt transmitting torque of the electric motor in the motor system. Moreover, accurate or more reliable detection of the state of the belt tension is enabled.

Sixth Embodiment

Figure 9:
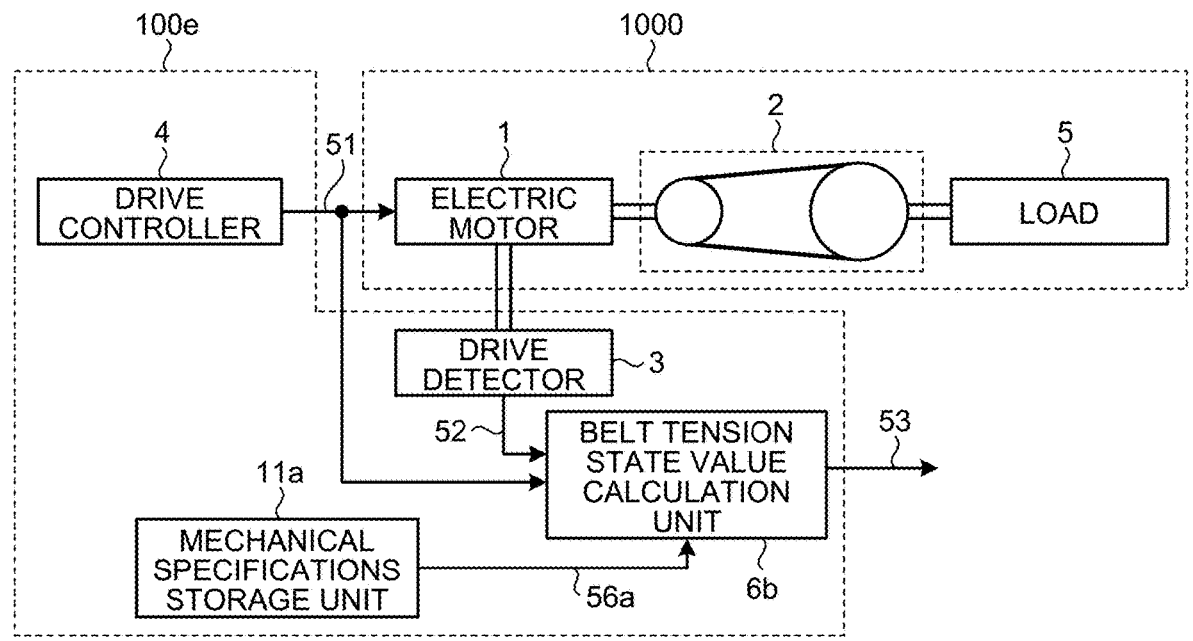
FIG. 9 is a block diagram illustrating a configuration of a motor control device according to a sixth embodiment of the present invention.

FIG. 9 is a block diagram illustrating a configuration of a motor control device 100e according to the sixth embodiment of the present invention. The motor control device 100e illustrated in FIG. 9 differs from the FIG. 5 motor control device 100a according to the second embodiment in including a mechanical specifications storage unit (second mechanical specifications storage unit) 11a. The motor control device 100e illustrated in FIG. 9 further differs from the motor control device 100a in including a belt tension state value calculation unit 6b in place of the belt tension state value calculation unit 6a.

On the basis of mechanical specifications 56a, the belt tension state value calculation unit 6b illustrated in FIG. 9 performs signal processing SP on the drive command signal 51 and the drive detection signal 52. The belt tension state value calculation unit 6a then outputs the belt tension state value 53, using signals obtained by the signal processing SP.

In a description of the motor control device 100e illustrated in FIG. 9, those constituent elements that are identical or correspond to the elements of the FIG. 5 motor control device 100a have the same reference characters. With reference to FIG. 9, a description will be made as to operation of the motor control device 100e. As with the mechanical specifications storage unit 11, the mechanical specifications storage unit 11a may be a storage medium, such as a semiconductor memory or a hard disk, or may be a computer with storage.

The mechanical specifications storage unit 11a stores the mechanical specifications (second mechanical specifications) 56a that include the belt tension S obtained (initially) at belt installation, characteristics of the belt 203, a radius of the drive pulley 201, a radius of the driven pulley 202, the electric-motor-side inertia $J_1$, and the load-machine-side inertia $J_2$, among others. The mechanical specifications 56a are mechanical characteristic values of the motor system 1000 that are relevant to a state of torsional vibration in the belt 203. As with the mechanical specifications 56 according to the fifth embodiment, the mechanical specifications 56a are not limited to the initial values.

On the basis of the mechanical specifications 56a, the belt tension state value calculation unit 6b performs the signal processing (first signal processing) SP on the drive command signal 51 and the drive detection signal 52. The belt tension state value 53 is then calculated on the basis of the signals obtained by the signal processing SP. When calculating the belt tension state value 53 from the signals obtained by the signal processing SP, the belt tension state value calculation unit 6b performs the same operation as the belt tension state value calculation unit 6a performs when calculating the belt tension state value 53 from the drive command signal 51 and the drive detection signal 52. A description will be made below as to the signal processing SP.

On the basis of the mechanical specifications 56a output from the mechanical specifications storage unit 11a, the belt tension state value calculation unit 6b calculates a predictive resonance frequency (second predictive resonance frequency) 58a that is a value predictive of the torsional vibration resonance frequency $f_r$. A filter is then configured to allow passage of only signal components within a predetermined frequency range. The predictive resonance frequency 58a is included in the above frequency range. In consideration of characteristics of disturbance components included in the signals, a type of filter to be used may be selected from among, for example, a band-pass filter, a low-pass filter, and a high-pass filter.

The drive command signal 51 and the drive detection signal 52 pass through this filter. In calculating the belt tension state value 53, the belt tension state value calculation unit 6b uses the signals that have passed through this filter. The above is one example of the signal processing SP. By performing the signal processing SP, the belt tension state value calculation unit 6b is capable of providing a reduced amount of noise and accurately calculating the belt tension state value 53. A signal component for the predictive resonance frequency 58a is included here in each of the signals that have passed through the filter.

The motor control device 100e may additionally include the belt tension anomaly determination unit 10 described in the fourth embodiment to more reliably or easily detect an anomaly in the belt tension S. The mechanical specifications storage unit 11a may be added to any one of the motor control devices 100, 100b, 100c, and 100d instead of to the motor control device 100a. A state of the belt tension S may then be accurately detected in each of the configurations.

As with the belt tension state value calculation unit 6a of FIG. 5, the belt tension state value calculation unit 6b is also capable of using a detection value of current in the electric motor 1 or a detection value of torque generated by the electric motor 1 in place of the drive command signal 51. When the motor control device 100e uses the current or the torque of the electric motor 1 in place of the drive command signal 51, the signal processing SP may be performed on the detection value of the current or the detection value of the torque for accurate detection of the state of the belt tension S.

With the signal processing SP that does not involve calculation of the predictive resonance frequency 58a, the state of the belt tension S is also accurately detectable. A given example of the signal processing SP involving no calculation of the predictive resonance frequency 58a is data sampling that obtains data from the drive command signal 51 or the drive detection signal 52. On the basis of the mechanical specifications 56a, the belt tension state value calculation unit 6b may determine conditions such as a data sampling interval and a duration of data sampling.

The data sampling may then be performed on the drive command signal 51 and the drive detection signal 52 in accordance with the determined conditions, and signals each having a reduced amount of noise may be used for accurate output of the belt tension state value 53. The belt tension state value calculation unit 6b may perform the signal processing SP on either the drive command signal 51 or the drive detection signal 52 to accurately output the belt tension state value 53 on the basis of a signal subjected to the signal processing SP and the signal subjected to no signal processing SP.

Even when one or more of those constituent elements of the motor control device 100e are provided to be separate from and external to a device including the belt tension state value calculation unit 6b, the state of the belt tension S is accurately detectable. Given examples of the device including the belt tension state value calculation unit 6b and having one or more elements provided externally thereof include a motor control device externally provided with the drive detector 3 or the mechanical specifications storage unit 11a, and a belt tension state detection device externally provided with the drive controller 4b, among others.

On the basis of the mechanical specifications 56a, the belt tension state value calculation unit 6b calculates the predictive resonance frequency 58a that is the value predictive of the torsional vibration resonance frequency $f_r$. The filter is then configured to allow passage of only those frequencies in the range that includes the signal component for the predictive resonance frequency 58a. The signal processing SP including the filtering in a frequency domain may be performed allowing the drive command signal 51 and the drive detection signal 52 to pass through this filter.

The conditions of the data sampling, such as the data sampling interval and the duration of data sampling, may be determined on the basis of the mechanical specifications 56a. The data sampling may then be performed on the drive command signal 51 and the drive detection signal 52 in accordance with the determined conditions. When the data sampling is to be performed, the mechanical specifications 56a may be used to determine the conditions of the data sampling from accuracy required of the belt tension state value 53.

For example, when whether or not a value of the belt tension S is within a predetermined normal range of values of the belt tension S is to be detected, a normal range of the torsional vibration resonance frequencies $f_r$ is calculated from the normal range of the belt tensions S through the use of the mechanical specifications 56a.

The conditions of the data sampling are then determined to provide a data interval that is necessary and sufficient to determine whether or not a detection value of the torsional vibration resonance frequency $f_r$ is within the normal range of the torsional vibration resonance frequencies $f_r$. Whether or not the value of the belt tension S is within the normal range may be detected with calculation thus done in a shorter time.

As described above, the belt tension state value calculation unit 6b performs the signal processing SP on the drive detection signal 52 on the basis of the mechanical specifications 56a of the motor system 1000 that are relevant to the state of the torsional vibration in the belt 203. The mechanical specifications 56a are stored in and output from the mechanical specifications storage unit 11a. The signal processing SP includes the filtering in the frequency domain or the data sampling. The belt tension state value calculation unit 6b also outputs the belt tension state value 53 on the basis of the signal obtained as a result of the signal processing SP performed on the drive detection signal 52.

The motor control device or the belt tension state detection device that is provided according to the present embodiment is capable of detecting, through use of the small-sized or simple device, the state of the belt tension in the belt transmitting torque of the electric motor in the motor system. Moreover, accurate detection of the state of the belt tension is enabled.

Seventh Embodiment

Figure 10:
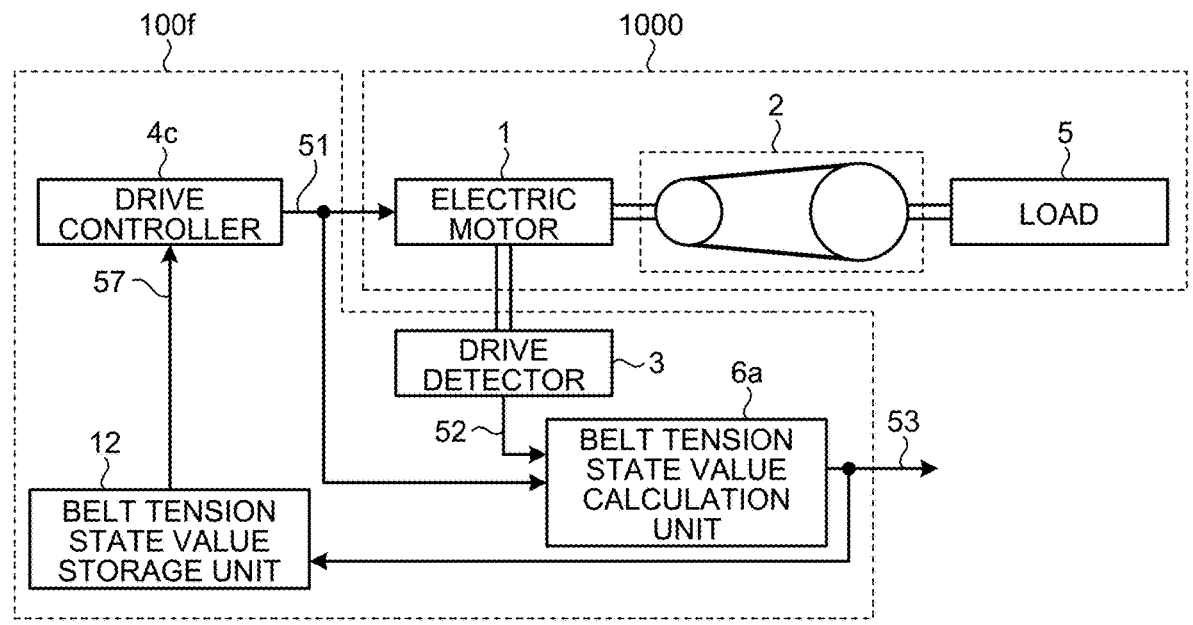
FIG. 10 is a block diagram illustrating a configuration of a motor control device according to a seventh embodiment of the present invention.

FIG. 10 is a block diagram illustrating a configuration of a motor control device 100f according to the seventh embodiment of the present invention. The motor control device 100f illustrated in FIG. 10 differs from the FIG. 5 motor control device 100a according to the second embodiment in including a belt tension state value storage unit (first belt tension state value storage unit) 12. The motor control device 100f of FIG. 10 further differs from the motor control device 100a in including a drive controller 4c in place of the drive controller 4. The drive controller 4c outputs the drive command signal 51 on the basis of a belt tension state value memory 57.

In a description of the motor control device 100f illustrated in FIG. 10, those elements that are identical or correspond to the elements of the motor control device 100a of FIG. 5 have the same reference characters. With reference to FIG. 10, a description will be made as to operation of the motor control device 100f. The belt tension state value storage unit 12 pre-stores the belt tension state value 53 as the belt tension state value memory (first belt tension state value memory) 57.

The belt tension state value storage unit 12 may be a storage medium such as a semiconductor memory or a hard disk. A computer with storage may also be used. On the basis of the belt tension state value memory 57 output from the belt tension state value storage unit 12, the drive controller 4c calculates a value predictive of the torsional vibration resonance frequency $f_r$. The predictive value calculated is taken as a resonance frequency calculation value (first resonance frequency calculation value) 59.

The drive controller 4c outputs the drive command signal 51 that includes a signal component for the resonance frequency calculation value 59. Accordingly, each of the drive command signal 51 and the drive detection signal 52 that the belt tension state value calculation unit 6a of FIG. 10 obtains more reliably includes the signal component for the torsional vibration resonance frequency $f_r$. The motor control device 100f is thus capable of more reliably detecting a state of the belt tension.

The drive controller 4c is also capable of causing the drive command signal 51 to have a narrower frequency band by using the resonance frequency calculation value 59. As a result, in calculating the belt tension state value 53, the belt tension state value calculation unit 6a of FIG. 10 can use the signals that each have a reduced amount of noise and include the signal component for the resonance frequency calculation value 59. Consequently, the motor control device 100f is capable of accurately detecting the state of the belt tension S.

The drive controller 4c is also capable of outputting the drive command signal 51 without calculating the resonance frequency calculation value 59. A given example of the operation that does not involve calculation of the resonance frequency calculation value 59 is operation of determining, on the basis of the belt tension state value memory 57, signal specifications of the drive command signal 51, such as a width of a frequency band, a data interval, and a data count per unit time.

Through the above operation given as an example, the drive command signal 51 including the signal component for the torsional vibration resonance frequency $f_r$ may be more reliably output. Moreover, each of the drive command signal 51 and the drive detection signal 52 may include a reduced amount of noise. An example is also given of how the drive controller 4c operates for determining the signal specifications of the drive command signal 51.

When, for example, whether or not a value of the belt tension S is within a predetermined normal range is to be detected, a range of normal variability of the belt tension S is determined using the belt tension state value memories 57. Moreover, the normal range of the belt tensions S is determined by reference to the determined range of variability, and a normal range of the torsional vibration resonance frequencies $f_r$ is determined from the normal range of the belt tensions S. The drive controller 4c may determine the signal specifications of the drive command signal 51 from a width of this normal range.

There can be a situation in which the drive controller 4c cannot use the belt tension state value memory 57 because no belt tension state value memory 57 is stored in the belt tension state value storage unit 12 when the belt tension state value 53 has never been output. In such a situation, a value predictive of the belt tension state value 53 may be calculated and used instead of the belt tension state value memory 57. Examples of numerical data to be used in calculation of this predictive value include numerical data such as the FIG. 8 mechanical specifications 56 according to the fifth embodiment and frequency response characteristics of the motor system 1000, among others.

It is to be noted that any one of the motor control devices 100, 100b, 100c, and 100e may additionally include the belt tension state value storage unit 12 to accurately or more reliably detect the state of the belt tension S. The drive controller 4c according to the present embodiment is also capable of outputting, instead of torque to be generated by the electric motor 1, an angle of rotation or an angular velocity for the motor system 1000 as with the drive controller 4.

Even when one or more of those elements of the FIG. 10 motor control device 100f are provided to be separate from and external to a device including the belt tension state value calculation unit 6a, the state of the belt tension S is accurately or more reliably detectable. Given examples of the device including the belt tension state value calculation unit 6a and having one or more constituent elements provided externally thereof include a motor control device externally provided with the drive detector 3 of FIG. 10 or the belt tension state value storage unit 12 of FIG. 10, and a belt tension state detection device externally provided with the drive controller 4c of FIG. 10, among others.

As described above, the drive controller 4c outputs the drive command signal 51 on the basis of the belt tension state value memory 57 output from the belt tension state value storage unit 12 that pre-stores the belt tension state value 53 as the belt tension state value memory 57.

The drive controller 4c may output the drive command signal 51 including the signal component for the resonance frequency calculation value 59 by calculating the resonance frequency calculation value 59 that is the value predictive of the torsional vibration resonance frequency $f_r$. The drive controller 4c may determine the signal specifications of the drive command signal 51, such as the width of the frequency band, the data interval, and the data count per unit time, on the basis of the belt tension state value memory 57 so that the drive command signal 51 is output having the determined signal specifications.

The motor control device or the belt tension state detection device that is provided according to the present embodiment is capable of detecting, through use of the small-sized or simple device, the state of the belt tension in the belt transmitting torque of the electric motor in the motor system. Moreover, accurate or more reliable detection of the state of the belt tension is enabled.

Eighth Embodiment

Figure 11:
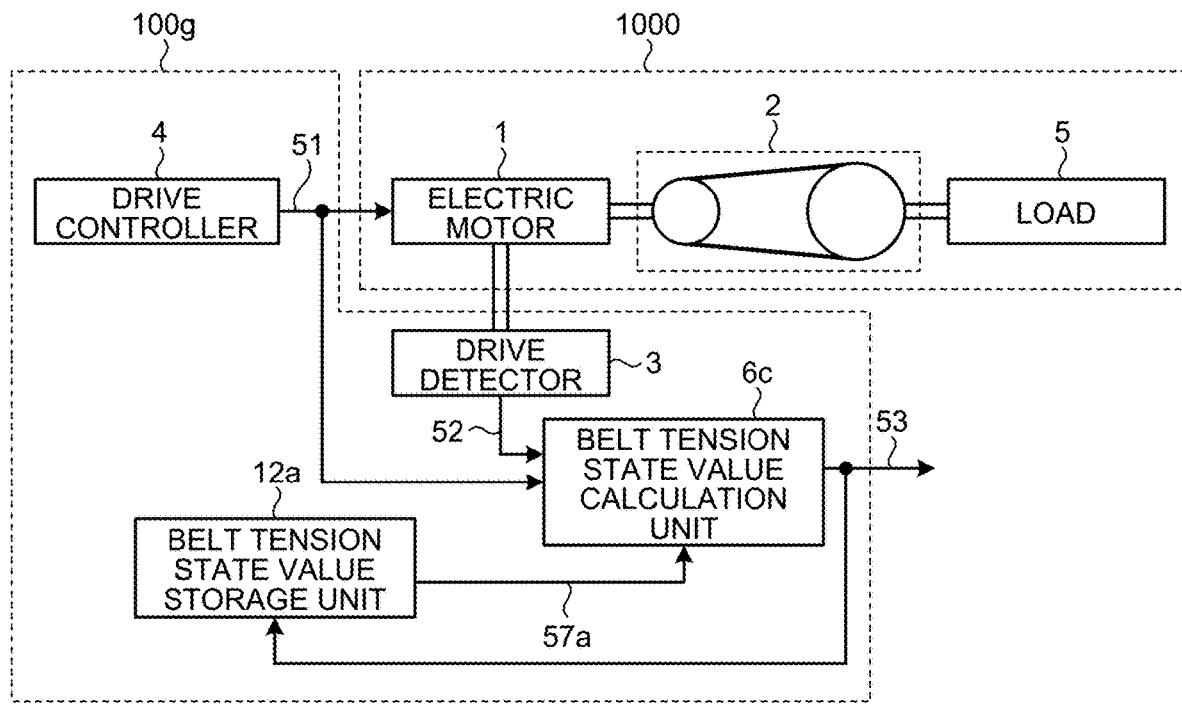
FIG. 11 is a block diagram illustrating a configuration of a motor control device according to an eighth embodiment of the present invention.

FIG. 11 is a block diagram illustrating a configuration of a motor control device 100g according to the eighth embodiment of the present invention. The motor control device 100g illustrated in FIG. 11 differs from the motor control device 100a of FIG. 5 according to the second embodiment in including a belt tension state value storage unit (second belt tension state value storage unit) 12a. The motor control device 100g of FIG. 11 further differs from the motor control device 100a of FIG. 5 in including a belt tension state value calculation unit 6c in place of the belt tension state value calculation unit 6a.

The belt tension state value calculation unit 6c of FIG. 11 performs signal processing SP1 on the drive command signal 51 and the drive detection signal 52 on the basis of a belt tension state value memory 57a that is the pre-stored belt tension state value 53. On the basis of signals obtained by the signal processing SP1, the belt tension state value calculation unit 6c outputs the belt tension state value 53.

In a description of the motor control device 100g illustrated in FIG. 11, those elements that are identical or correspond to the elements of the motor control device 100a of FIG. 5 have the same reference characters. With reference to FIG. 11, a description will be made below as to operation of the motor control device 100g.

The belt tension state value storage unit 12a pre-stores the belt tension state value 53 as the belt tension state value memory (second belt tension state value memory) 57a. On the basis of the belt tension state value memory 57a, the belt tension state value calculation unit 6c performs the signal processing SP1 on the drive command signal 51 and the drive detection signal 52.

The belt tension state value calculation unit 6c also outputs the belt tension state value 53 on the basis of the signals obtained as a result of the signal processing SP1 performed on the drive command signal 51 and the drive detection signal 52. When calculating the belt tension state value 53 from the signals obtained by the signal processing SP1, the belt tension state value calculation unit 6c performs the same operation as the belt tension state value calculation unit 6a performs when calculating the belt tension state value 53 from the drive command signal 51 and the drive detection signal 52.

A description will be made below as to the signal processing SP1. The belt tension state value calculation unit 6c calculates a resonance frequency calculation value (second resonance frequency calculation value) 59a on the basis of the belt tension state value memory 57a. The resonance frequency calculation value 59a is a value predictive of the torsional vibration resonance frequency $f_r$ of the belt drive unit 2. The belt tension state value calculation unit 6c extracts the signals each including a signal component for the resonance frequency calculation value 59a from each of the drive command signal 51 and the drive detection signal 52.

By using the resonance frequency calculation value 59a, the belt tension state value calculation unit 6c is capable of using, in calculating the belt tension state value 53, the signals that each include the signal component for the resonance frequency calculation value 59a and have a reduced amount of noise because of a narrower frequency band. Consequently, a state of the belt tension S is accurately detectable.

When the belt tension state value calculation unit 6c cannot use the belt tension state value memory 57a, a calculated value predictive of the belt tension state value 53 may be used instead of the belt tension state value memory 57a as in the case of the belt tension state value storage unit 12 according to the seventh embodiment.

The signal processing SP1 may be signal processing not involving calculation of the resonance frequency calculation value 59a. A given example of the signal processing SP1 involving no calculation of the resonance frequency calculation value 59a is data sampling. For the data sampling, conditions of the data sampling, such as a data sampling interval and a duration of data sampling, may be determined on the basis of the belt tension state value memory 57a.

Performing the signal processing SP1 using the above data sampling given as the example, on the drive command signal 51 and the drive detection signal 52 can reduce amounts of noise of signals which the belt tension state value calculation unit 6c uses in calculating the belt tension state value 53. Improved accuracy, then, may be achieved in detection of the state of the belt tension S. An example will be given of how the belt tension state value calculation unit 6c operates for determining the conditions of the data sampling.

When whether or not a value of the belt tension S is within a normal range of the belt tensions S is to be detected, a range of normal variability of the belt tension S is determined using the belt tension state value memories 57a. Moreover, the normal range of the belt tensions S is set on the basis of the determined range of normal variability of the belt tension S, and a normal range of the torsional vibration resonance frequencies $f_r$ is calculated from the normal range of the belt tensions S. The conditions of the data sampling are then determined from a width of the calculated normal range of the torsional vibration resonance frequencies $f_r$.

Any one of the motor control devices 100, 100b, 100c, 100d, and 100f may additionally include the belt tension state value storage unit 12a to accurately detect the state of the belt tension S. While the belt tension state value calculation unit 6c of FIG. 11 performs the signal processing SP1 on both the drive command signal 51 and the drive detection signal 52, the signal processing SP1 may be performed on either the drive command signal 51 or the drive detection signal 52.

As with the belt tension state value calculation unit 6a of FIG. 5, the belt tension state value calculation unit 6c of FIG. 11 is also capable of using a detection value of current flowing in the electric motor 1 or a detection value of torque generated by the electric motor 1 in place of the drive command signal 51. When the detection value of the current or the detection value of the torque of the electric motor 1 is used, the signal processing SP1 may be performed on the detection value of the current or the detection value of the torque for accurate detection of the state of the belt tension S.

As in the case of the motor control device 100g, one or more of those elements of the motor control device 100g illustrated in FIG. 11 may be separate from and external to a device including the belt tension state value calculation unit 6c for accurate detection of the state of the belt tension S. Given examples of the device including the belt tension state value calculation unit 6c and having one or more elements provided externally thereof include a motor control device externally provided with the drive detector 3 or the belt tension state value storage unit 12a, and a belt tension state detection device externally provided with the drive controller 4, among others.

The belt tension state value calculation unit 6c performs the signal processing SP1 on the drive detection signal 52 on the basis of the belt tension state value memory 57a output from the belt tension state value storage unit 12a that pre-stores the belt tension state value 53 as the belt tension state value memory 57a. The belt tension state value 53 is output on the basis of the signal obtained as a result of the signal processing SP1 performed on the drive detection signal 52.

The belt tension state value calculation unit 6c may calculate the resonance frequency calculation value 59a, which is the value predictive of the torsional vibration resonance frequency $f_r$, on the basis of the belt tension state value memory 57a and extract the signals each including the signal component for the resonance frequency calculation value 59a from each of the drive command signal 51 and the drive detection signal 52.

The belt tension state value calculation unit 6c may determine the conditions of the data sampling, such as the data sampling interval and the duration of data sampling, on the basis of the belt tension state value memory 57a, and perform the data sampling on the drive command signal 51 and the drive detection signal 52 in accordance with the determined conditions.

The motor control device or the belt tension state detection device that is provided according to the present embodiment is capable of detecting, through use of the small-sized or simple device, the state of the belt tension in the belt transmitting torque of the electric motor in the motor system. Moreover, accurate detection of the state of the belt tension is enabled.

Ninth Embodiment

Figure 12:
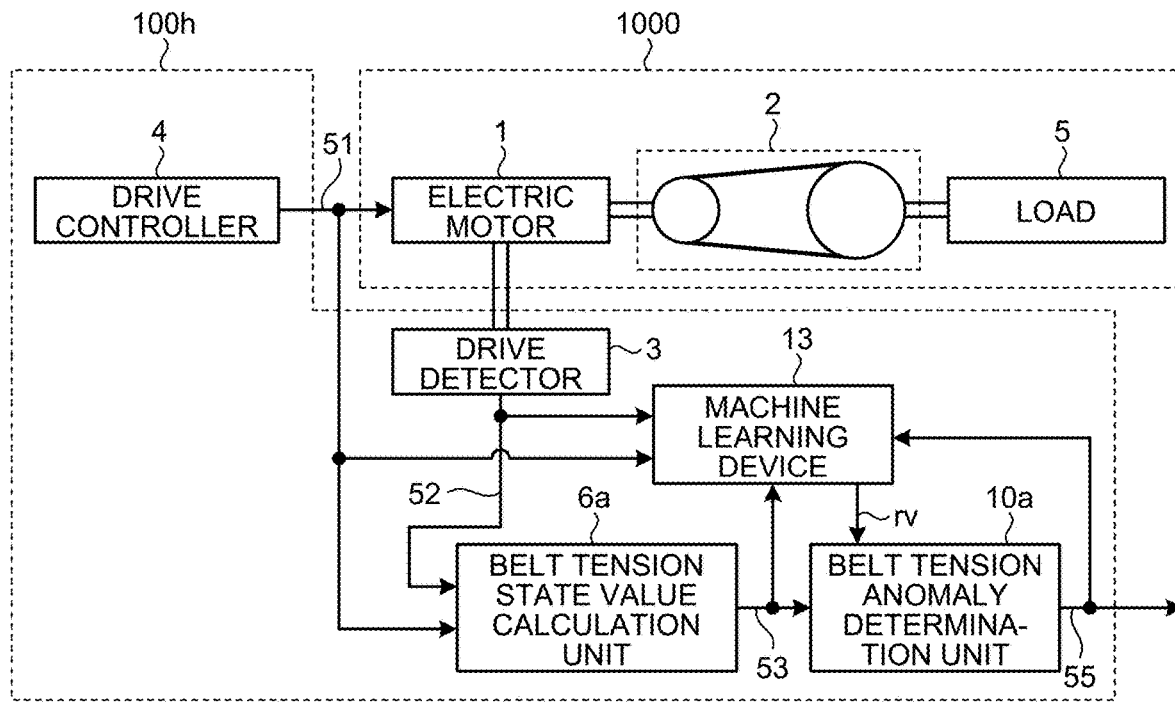
FIG. 12 is a block diagram illustrating a configuration of a motor control device according to a ninth embodiment of the present invention.

FIG. 12 is a block diagram illustrating a configuration of a motor control device 100h according to the ninth embodiment of the present invention. Compared with the motor control device 100c of FIG. 7 according to the fourth embodiment, the motor control device 100h includes a belt tension anomaly determination unit 10a in place of the belt tension anomaly determination unit 10. In addition to the other elements of the motor control device 100c illustrated in FIG. 7, the motor control device 100h also includes a machine learning device 13. In the present embodiment, those elements identical or correspond to the constituent elements in FIG. 7 according to the fourth embodiment have the same reference characters.

As with the belt tension anomaly determination unit 10, the belt tension anomaly determination unit 10a compares the belt tension state value 53 and a reference value and, on the basis of a comparison result, outputs, as the belt tension anomaly determination value 55, a value indicating whether a state of the belt tension S is normal or anomalous. The reference value that the belt tension anomaly determination unit 10a uses in the determination is obtained from the machine learning device 13. The reference value that the belt tension anomaly determination unit 10a uses in the determination is hereafter denoted by rv. The machine learning device 13 learns the reference value rv in accordance with a training data set created on the basis of a state variable sv. On the basis of a result of learning, the above reference value rv is determined.

Figure 13:
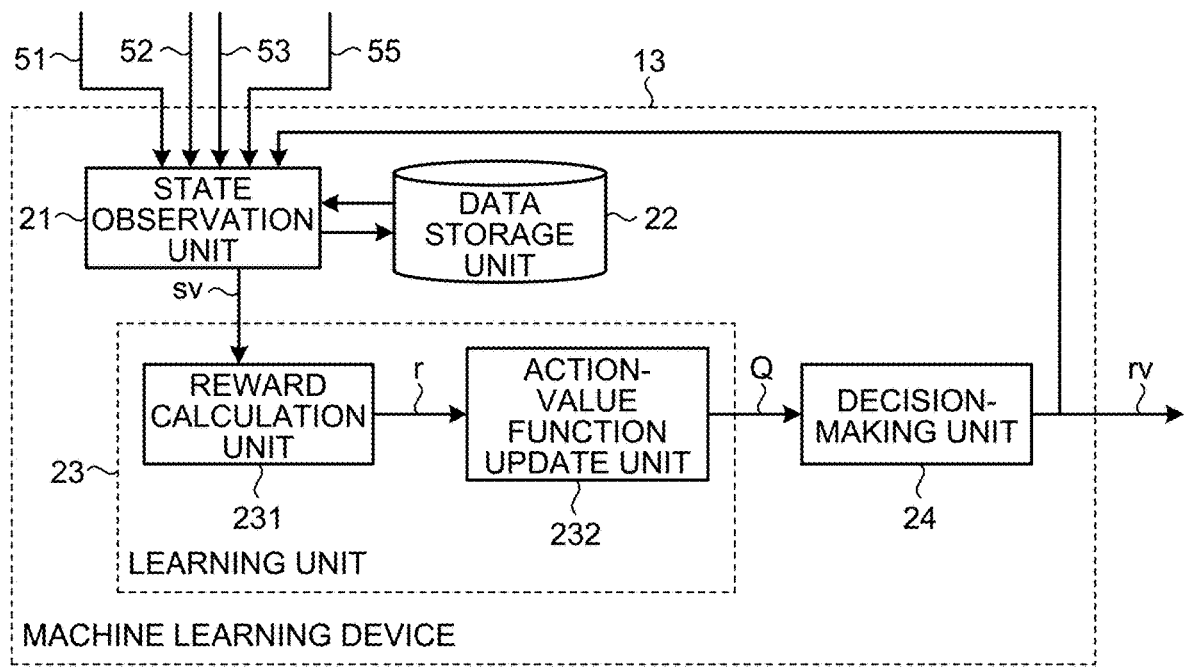
FIG. 13 is a block diagram illustrating a configuration of a machine learning device included in the motor control device according to the ninth embodiment of the present invention.

FIG. 13 is a block diagram illustrating a configuration of the machine learning device 13 included in the motor control device 100h according to the ninth embodiment.

The machine learning device 13 includes a state observation unit 21, a data storage unit 22, a learning unit 23, and a decision-making unit 24. The learning unit 23 includes a reward calculation unit 231 and an action-value function update unit 232. The state observation unit 21 obtains the drive command signal 51, the drive detection signal 52, the belt tension state value 53, the belt tension anomaly determination value 55, and the reference value rv and determines the state variable sv. It is to be noted here that the state observation unit 21 may be configured not to obtain the drive command signal 51 and the drive detection signal 52.

The data storage unit 22 stores the drive command signal 51, the drive detection signal 52, the belt tension state value 53, the belt tension anomaly determination value 55, and the reference value rv all of which the state observation unit 21 has obtained. The data storage unit 22 also stores the determined state variable sv. Using the data storage unit 22, the state observation unit 21 may perform, on signal information thus obtained, data processing such as sorting by time, data organization by relevance, after which the state observation unit 21 outputs that data-processed information as the state variable sv to the learning unit 23. The data storage unit 22 may be provided as required and thus may be omitted. The data storage unit 22 may be external to, for example, the machine learning device 13 or the motor control device 100h.

The learning unit 23 learns the reference value rv in accordance with the training data set created on the basis of the state variable sv. In other words, the learning unit 23 learns the reference value rv in association with the state variable sv. In the present embodiment, a description is made as to reinforcement learning applied as an example. However, a limiting learning algorithm used by the learning unit 23 according to the present embodiment is not limited to the reinforcement learning. The learning unit 23 is capable of learning using various learning algorithms. Supervised learning, unsupervised learning, and semi-supervised learning are among the learning algorithms that are applicable. Each of the above-mentioned learning algorithms may use deep learning that learns extraction of a feature quantity itself. Machine learning may be performed in accordance with another method such as a neural network, genetic programming, functional logic programming, a support-vector machine, or Bayesian optimization.

The reinforcement learning is such that an agent (subject of actions) in a certain environment observes a current state and determines an action to take. The agent chooses the action and obtains a reward from the environment. Through a series of the actions, the agent learns a policy that maximizes reward. Those known as typical reinforcement learning methods include Q-learning and temporal difference learning (TD-learning). In the case of the Q-learning, for example, a general update equation for an action-value function Q(s,a) is expressed by Formula (6). The update equation may be expressed in an action value table.

[Formula 6]

$$Q(s_t, a_t) \leftarrow Q(s_t, a_t) + \alpha \left( r_{t+1} + \gamma \max_s Q(s_{t+1}, a) - Q(s_t, a_t) \right) \quad (6)$$

In Formula (6), $s_t$ represents an environment at a time t, and $a_t$ represents an action at the time t. The action $a_t$ shifts the environment to an environment $s_{t+1}$. $r_{t+1}$ represents a reward received as a result of the shifting of the environment, $\gamma$ represents a discount factor, and $\alpha$ represents a learning rate. The discount factor $\gamma$ is greater than 0 and less than or equal to 1 ($0<\gamma\leq1$), and the learning rate a is greater than 0 and less than or equal to 1 ($0<\alpha\leq1$). When the Q-learning is applied in the present embodiment, the action $a_t$ refers to the determined reference value rv.

An example is given of operation of the reward calculation unit 231. The reward calculation unit 231 generates a plurality of sets each including the belt tension state value 53, the reference value rv, the belt tension anomaly determination value 55, and presence or absence of an actual anomaly. The presence or absence of the actual anomaly is determined from the state variable sv based on the drive command signal 51, the drive detection signal 52, the belt tension state value 53, and the others. The reward calculation unit 231 may collate presence or absence of an anomaly indicated by the belt tension anomaly determination value 55 with the presence or absence of the actual anomaly and takes, as a reward r, a value obtained by dividing a match count by a total collation count. This enables learning of the reference value rv that provides a more accurate determination result because the greater the number of times the determination made by the belt tension anomaly determination unit 10a matches the presence or absence of the actual anomaly, the higher the given reward.

When the belt tension anomaly determination value 55 indicates a type of anomaly, the reward calculation unit 231 may collate the type of anomaly indicated by the belt tension anomaly determination value 55 with a type of actual anomaly. Then, when the presence or absence of the anomaly and the type of anomaly both match, the given reward may be highest. When the presence or absence of the anomaly matches, with the type of anomaly not matching, the given reward may be moderate. When the presence or absence of the anomaly does not match, the given reward may be low or negative. This enables learning of the reference value rv that enables more accurate detection of the presence or absence of the anomaly and the type of anomaly.

On the basis of the reward r calculated by the reward calculation unit 231 and the state variable sv, the action-value function update unit 232 updates the action-value function Q for calculation of the reference value rv. The decision-making unit 24 determines the reference value rv on the basis of the action-value function Q. Specifically, the decision-making unit 24 determines the action $a_t$, namely, the reference value rv for which the updated action-value function Q becomes largest. Updating the reference value rv in this way enables further learning of the reference value rv that in turn enables more accurate anomaly determination.

A plurality of motor systems similar to the motor system 1000 may be provided to perform determinations in parallel for efficient promotion of learning. The motor control device 100h that has learned using the data obtained from the motor system 1000 may be connected to another motor system and perform further learning using data obtained from the other motor system.

A motor control device may be configured using a learned learning unit equipped with learning results of the present embodiment. The above learned learning unit may be implemented by a learned program that determines the reference value rv by using the action-value function Q updated by the learning according to the present embodiment. The above learned learning unit may be implemented by use of learned data storing results of adjustment of the reference value rv that have been obtained from the learning according to the present embodiment. As a result of addition of the learned program, the learned data, or the like to a motor control device, the motor control device capable of using the learning results becomes available in a shorter time. The methods described in the present embodiment may be used, for example, in automatic adjustment of the reference value rv and manufacture of motor control devices.

The motor control device or a belt tension state detection device that is provided according to the present embodiment is capable of detecting, through use of the small-sized or simple device, the state of the belt tension in the belt transmitting torque of the electric motor in the motor system. Also enabled is the learning of the reference value rv that is used in determination of whether or not there is an anomaly in the belt tension. This enables the provided motor control device to more accurately determine whether or not there is the anomaly.

The embodiments described above are usable in combinations as required. The above configurations illustrated in the embodiments are illustrative of contents of the present invention, can be combined with other techniques that are publicly known and can be partly omitted or changed without departing from the gist of the present invention.

REFERENCE SIGNS LIST 1 electric motor; 2 belt drive unit; 3 drive detector; 4, 4a, 4b, 4c drive controller; 5 load machine; 6, 6a, 6b, 6c belt tension state value calculation unit; 9 operating command generation unit; 10, 10a belt tension anomaly determination unit; 11, 11a mechanical specifications storage unit; 12, 12a belt tension state value storage unit; 13 machine learning device; 21 state observation unit; 22 data storage unit; 23 learning unit; 24 decision-making unit; 51 drive command signal; 52 drive detection signal; 53 belt tension state value; 54 operating command signal; 55 belt tension anomaly determination value; 56, 56a mechanical specifications; 57, 57a belt tension state value memory; 100, 100a, 100b, 100c, 100d, 100e, 100f, 100g, 100h motor control device; 201 drive pulley; 202 driven pulley; 203 belt; 231 reward calculation unit; 232 action-value function update unit; 1000 motor system; Q action-value function; S belt tension; SP, SP1 signal processing; sv state variable; r reward; rv reference value; $f_r$ torsional vibration resonance frequency.

The invention claimed is:

1. A motor control device comprising:
a drive controller to output a drive command signal that drives an electric motor of a motor system, the motor system including a belt driver defined by a drive pulley, a driven pulley, and a belt wound on the driven pulley and the drive pulley, a load machine mechanically connected to the driven pulley, and the electric motor mechanically connected to the drive pulley; and
a belt tension state value calculator to output a belt tension state value on a basis of a ratio of frequency characteristics of a drive detection signal to frequency characteristics of any one of the drive command signal, a detection value of current in the electric motor, and a detection value of torque of the electric motor, a drive detection signal detecting one of an angle of rotation, an angular velocity, and an angular acceleration in the motor system, the belt tension state value indicating a state of belt tension in the belt.

2. The motor control device according to claim 1, wherein the belt tension state value calculator outputs the belt tension state value on a basis of a result of detection of a state of torsional vibration of the belt driver.

3. The motor control device according to claim 1, further comprising
an operating command generator to output an operating command signal, the operating command signal being a command for operation of an electric motor and serving as a target in generation of the drive command signal, wherein
on a basis of the operating command signal and the drive detection signal, the drive controller outputs the drive command signal that causes the electric motor to follow the operating command signal.

4. The motor control device according to claim 1, further comprising a belt tension anomaly determiner to compare the belt tension state value and a predetermined reference value and to output, on a basis of a result of the comparison, a belt tension anomaly determination value indicating whether a state of belt tension in the belt is normal or anomalous.

5. The motor control device according to claim 4, further comprising a machine learning device including:
- a state observer to observe a state variable including the belt tension state value and the belt tension anomaly determination value; and
- a learner to learn the reference value in accordance with a training data set created on a basis of the state variable.

6. The motor control device according to claim 5, wherein the learner includes:
- a reward calculator to calculate a reward on a basis of the reference value and the state variable; and
- an action-value function updater to update, on a basis of the state variable and the reward, an action-value function for calculation of the reference value.

7. The motor control device according to claim 6, wherein the machine learning device also includes
- a decision-maker to determine the reference value on a basis of the action-value function.

8. The motor control device according to claim 1, wherein the drive controller outputs the drive command signal on a basis of first mechanical specifications stored in and output from a first mechanical specifications storage, the first mechanical specifications being relevant to a state of torsional vibration of the belt driver.

9. The motor control device according to claim 1, wherein the belt tension state value calculator performs first signal processing on the drive detection signal on a basis of second mechanical specifications stored in and output from a second mechanical specifications storage, the second mechanical specifications being relevant to a state of torsional vibration of the belt driver, the first signal processing including one of filtering in a frequency domain and data sampling, and the belt tension state value calculator unit outputs the belt tension state value on a basis of a signal obtained as a result of the first signal processing performed on the drive detection signal.

10. The motor control device according to claim 1, wherein the drive controller outputs the drive command signal on a basis of a first belt tension state value memory output from a first belt tension state value storage pre-storing the belt tension state value as the first belt tension state value memory.

11. The motor control device according to claim 1, wherein the belt tension state value calculator performs second signal processing on the drive detection signal on a basis of a second belt tension state value memory output from a second belt tension state value storage pre-storing the belt tension state value as the second belt tension state value memory, the second signal processing including one of filtering in a frequency domain and data sampling, and the belt tension state value calculator outputs the belt tension state value on a basis of a signal obtained as a result of the second signal processing performed on the drive detection signal.

12. A belt tension state detection device comprising a belt tension state value calculator to output a belt tension state value on a basis of a ratio of frequency characteristics of a drive detection signal to frequency characteristics of any one of a drive command signal, a detection value of current in an electric motor, and a detection value of torque of the electric motor, a drive detection signal detecting one of an angle of rotation, an angular velocity, and an angular acceleration in a motor system, the belt tension state value indicating a state of belt tension in a belt, the motor system including a load machine, a driven pulley mechanically connected to the load machine, the belt wound on the driven pulley, a drive pulley having the belt wound thereon, and an electric motor that is mechanically connected to the drive pulley and is driven by a drive command signal output from a drive controller.

* * * * *